United States Patent
Zhao et al.

(10) Patent No.: US 11,226,234 B2
(45) Date of Patent: Jan. 18, 2022

(54) SPECTRUM SHAPING DEVICES AND TECHNIQUES FOR OPTICAL CHARACTERIZATION APPLICATIONS

(71) Applicant: Applied Materials, Inc., Santa Clara, CA (US)

(72) Inventors: Guoheng Zhao, Palo Alto, CA (US); Edward W. Budiarto, Fremont, CA (US); Todd J. Egan, Fremont, CA (US)

(73) Assignee: Applied Materials, Inc., Santa Clara, CA (US)

(*) Notice: Subject to any disclaimer, the term of this patent is extended or adjusted under 35 U.S.C. 154(b) by 10 days.

(21) Appl. No.: 16/749,168

(22) Filed: Jan. 22, 2020

(65) Prior Publication Data
US 2021/0223102 A1 Jul. 22, 2021

(51) Int. Cl.
*G01J 3/28* (2006.01)
*G01J 3/14* (2006.01)
*G02B 6/293* (2006.01)
*G01J 3/02* (2006.01)

(52) U.S. Cl.
CPC ............ *G01J 3/2823* (2013.01); *G01J 3/021* (2013.01); *G01J 3/14* (2013.01); *G02B 6/29313* (2013.01); *G02B 6/29389* (2013.01); *G01J 2003/2826* (2013.01)

(58) Field of Classification Search
CPC .................................................... G01J 3/2823
USPC .................................................... 356/328
See application file for complete search history.

(56) References Cited

U.S. PATENT DOCUMENTS

| | | | |
|---|---|---|---|
| 4,961,195 A | 10/1990 | Skupsky et al. | |
| 5,784,158 A | 7/1998 | Stanco et al. | |
| 5,846,373 A * | 12/1998 | Pirkle | G01B 11/0683 156/345.25 |
| 7,817,272 B2 | 10/2010 | Koeppen et al. | |
| 2009/0237765 A1* | 9/2009 | Lippert | G02B 21/06 359/213.1 |

(Continued)

FOREIGN PATENT DOCUMENTS

| | | |
|---|---|---|
| JP | 2015-212806 A | 11/2015 |
| WO | 2018/048306 A1 | 3/2018 |

OTHER PUBLICATIONS

International Search Report and Written Opinion for International Application No. PCT/US2021/014458, dated Apr. 29, 2021, 10 pages.

*Primary Examiner* — Tarifur R Chowdhury
*Assistant Examiner* — Omar H Nixon
(74) *Attorney, Agent, or Firm* — Lowenstein Sandler LLP

(57) ABSTRACT

Implementations disclosed describe a system comprising a first optical device to receive an input beam of light, the input beam having a plurality of spectral components of light, and cause the input beam to disperse into a plurality of spectral beams, wherein each of the plurality of spectral beams corresponds to one of the plurality of spectral components and propagates along a spatial path that is different from spatial paths of other spectral beams, and a second optical device to collect a portion of each of the spectral beams, wherein the collected portion depends on the spatial path of the respective spectral beam, and form an output beam of light from the collected portion of each of the spectral beams, wherein a spectral profile of the output beam is different from a spectral profile of the input beam of light.

19 Claims, 15 Drawing Sheets

(56) References Cited

U.S. PATENT DOCUMENTS

| | | |
|---|---|---|
| 2016/0103384 A1 | 4/2016 | Schmidt et al. |
| 2016/0187675 A1* | 6/2016 | Kim .................... G02B 6/4209 250/227.23 |
| 2016/0294146 A1 | 10/2016 | Tsia et al. |
| 2017/0350575 A1* | 12/2017 | Hill .......................... G01J 3/18 |

* cited by examiner

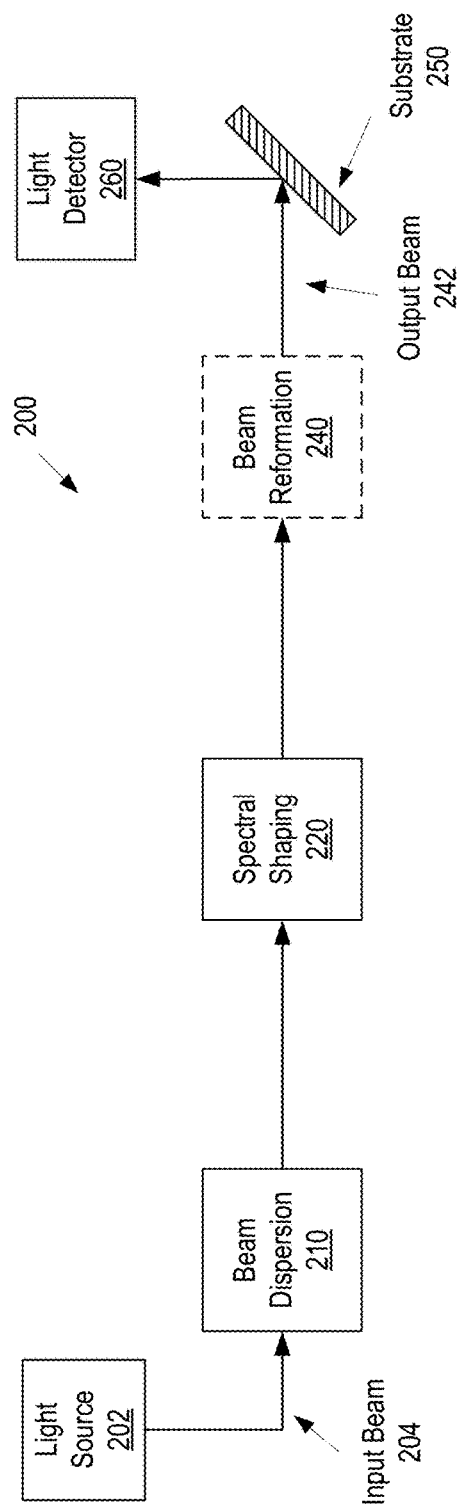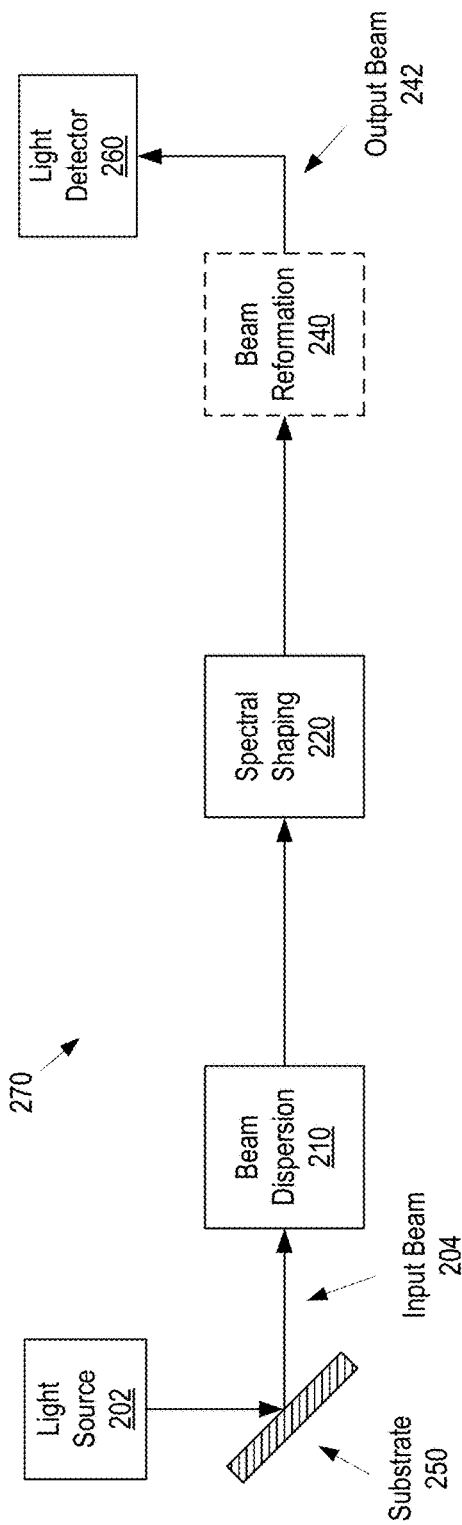

SPECTRUM SHAPING DEVICES AND TECHNIQUES FOR OPTICAL CHARACTERIZATION APPLICATIONS

TECHNICAL FIELD

This instant specification generally relates to fabrication of integrated circuits and other semiconductor devices in process chambers. More specifically, the instant specification relates to spectrum shaping techniques and devices for precise optical characterization of substrates and various other objects used in device manufacturing.

BACKGROUND

Manufacturing of microelectronics and integrated circuit devices often involves performing numerous operations on semiconductor, dielectric and conductive substrates. Examples of these operations include oxidation, diffusion, ion implantation, thin film deposition, cleaning, etching, lithography, and so on. Materials manufactured in this manner may include monocrystals, semiconductor films, fine coatings, and numerous other substances used in electronic device manufacturing and other practical applications. As atoms of selected types are added (e.g., via deposition) to substrates or removed (e.g., via etching) from the substrates, efficient and precise quality control monitoring techniques (and systems) become critical. Under-developed or over-developed (e.g., under-etched or over-etched) substrates as well as substrates that fail to adhere to required specifications may result in substandard and even malfunctioning devices. Optical control systems, which allow for real-time monitoring of various stages of device manufacturing, significantly improve quality of the products. This is especially important given that the demands to the quality of semiconductor devices are constantly increasing.

BRIEF DESCRIPTION OF THE DRAWINGS

The present disclosure will be understood more fully from the detailed description given below and from the accompanying drawings of various implementations of the disclosure.

FIG. 2A illustrates schematically a sequence of transformations to perform spectral shaping of an input light beam for precise optical characterization of targets within device manufacturing systems, in accordance with some implementations of the present disclosure.

FIG. 2B illustrates schematically a sequence of transformations to perform spectral shaping of the light beam reflected from the substrate, in accordance with some implementations of the present disclosure.

DETAILED DESCRIPTION

Figure 1A:
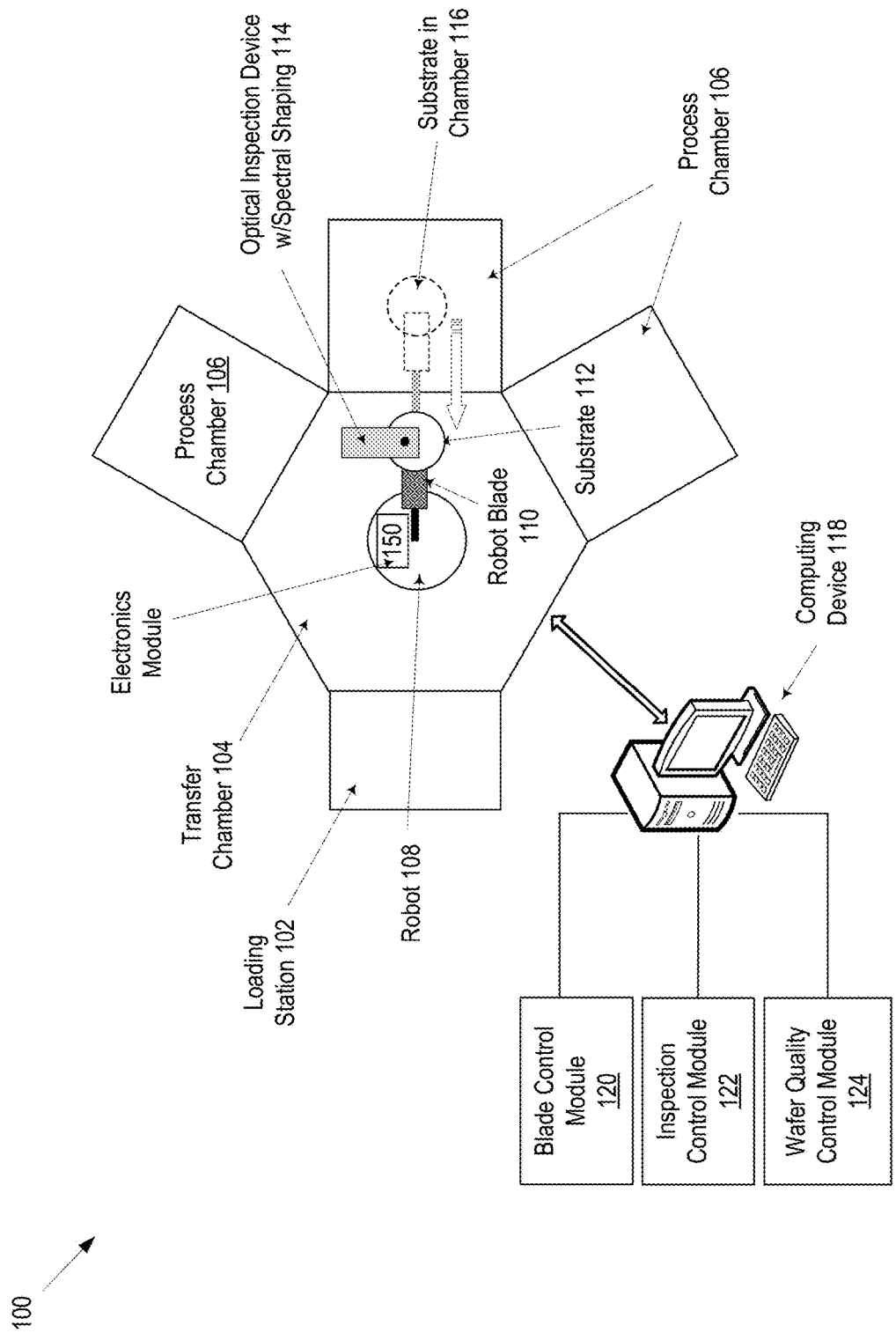
FIG. 1A illustrates one exemplary implementation of a manufacturing machine capable of supporting optical inspection of substrates using spectral shaping.

The implementations disclosed herein provide for spectrum shaping of various beams of light used in optical characterization of substrates and various other objects used in semiconductor device manufacturing. Because more information is generally available when targets are probed with a wider range of spectral components of light, broadband light sources are typically used. Often, light reaching a light detector has some spectral components that are significantly underrepresented compared with other spectral components. This may occur because of a non-uniformity of spectra emitted by the light source(s) as well as various parts of the emitted light having different attenuation levels along the optical path. As a result, the light detector may be saturated with spectral components of some parts of the spectrum while receiving too few waves belonging to other parts of the spectrum.

Robotic systems allow a quick and efficient delivery of substrates for processing into a process chamber and an automated retrieval of the processed substrates from the process chamber. Robotic delivery/retrieval systems greatly increase a yield of the manufacturing process but pose some specific quality control challenges. At least some—and, ideally, all—processed substrates need to be examined for compliance with the process specification. Yet, stopping the manufacturing process (e.g., randomly) to test an occasional output substrate has a number of disadvantages. The substrate being tested is, as a consequence, being exposed to a testing environment (e.g., of a testing chamber) for a longer period of time compared to those output substrates that are not subjected to the same testing. This introduces intrinsic inaccuracy into the testing procedure and, additionally, results in a non-uniformity of the substrate yield where the untested substrates may have properties that are somewhat different from the tested substrates (e.g., the tested substrates may have more contaminants due to a longer exposure to the post-processing environment). Furthermore, stopping the manufacturing process and then restarting it, even if performed occasionally, reduces the speed of substrate manufacturing.

As a result, it may be advantageous to perform substrate testing "on the fly" (e.g., using optical inspection methods) while the substrate is being transported from the process chamber to the transfer chamber or loading/unloading chamber. An optical inspection device may have a light source, to direct a beam of light at one or more target locations on the substrate, and a light detector to detect light reflected from the substrate and obtain reflectivity $R(\lambda)$ data for various target locations of the substrate, for a broad range of wavelengths $\lambda$. Based on the reflectivity (or ellipsometry) data, a processing device (e.g., a computing system equipped with a processor and a memory) may determine a variety of characteristics of the substrate: film thickness, pattern critical dimensions, uniformity of the substrate (from comparison of the reflectivity $R(\lambda)$ across multiple locations of the substrate), the amount of contaminants (from comparing the reflectivity $R(\lambda)$ to a benchmark reflectivity stored in the memory), the smoothness of the surface of the substrate (from detecting a degree of non-specular diffuse reflection of light), and the like.

The reflectivity data may be obtained for some parts of visible, infrared (IR), and ultraviolet (UV) spectra. Because the time available for optical inspection of the substrates is necessarily limited, yet having data for a wide range of wavelengths is beneficial for the accuracy of substrate characterization, using broadband sources of light is advantageous for substrate testing.

However, concurrent handling of multiple spectral components within a wide range of wavelengths presents a number of challenges. Various spectral components emitted by a light source may have different intensities. For example, emitted IR components may have much weaker intensities compared with the visible light components. Designing light sources with desired spectral output may be a challenging task. Various spectral components may be attenuated differently along the optical path of the light (which may include delivery path of the light incident on the target surface and a path of the light reflected from the target surface). For example, UV components may be significantly more attenuated compared with the visible light parts of the spectrum. As a result, the light delivered to the light detector may have intensities of the spectral components that are orders of magnitude stronger for some parts of the spectrum compared with other parts. This may lead to an oversaturation of the light detector with the overrepresented spectral components. For example, the visible part of the delivered light may be much stronger than the respective IR and UV parts even though the IR and UV parts of the spectrum are often critical to measuring dimensions and properties of certain films. Merely increasing the overall intensity of the light source may not effectively address this problem since such a remedy would correspondingly increase the overrepresented components and result in a further saturation of the light detector.

Finally, the light detector may have different sensitivities to various spectral components of the delivered light. For example, the light detector may be less sensitive to the IR part of the spectrum, so it may be beneficial to ensure that the IR part of the delivered light spectrum has a higher intensity relative to other components. Accordingly, in many situations it may be advantageous to control spectral shape of a light delivered to a target surface (or, similarly, a light delivered from the target surface to the light detector), based on the specification of the light source and the light detector, while also accounting for attenuation of various spectral components along their optical paths.

The implementations disclosed herein address this and other shortcomings of the existing technology by providing for a spatial (or temporal) separation of a beam of light into multiple (e.g., a continuum of) spectral beams and controlling the intensity of the spectral beams to achieve a desired spectral profile of the light that ultimately reaches the light detector. The spatial separation may be achieved by directing the input light beam into one or more dispersive optical devices, such as prisms, gratings, dispersive scattering media, and the like. In some implementations, to control intensity of the spectral beams, the beams may be directed through (one or more) aperture(s). The temporal separation may be achieved by directing the input light beam through a broadband dynamic filter having multiple narrow-band (chromatic) filters configured to engage with the input beam for controlled amounts of time. In some implementations, the modified (through the use of apertures and/or filters) spectral beams may be recombined (using one or more optical elements, such as lenses, mirrors, prisms, gratings, and the like) into a single output beam of light having a modified (shaped) spectrum.

The implementations disclosed provide for devices and techniques for spatial or temporal separation of various spectral components of light beams and selective reduction of the intensity of some of the components to achieve an improved spectral profile for efficient reflectometry and/or ellipsometry measurements. The improved presence of (often underrepresented) spectral components (e.g., IR and UV components) capable of providing valuable optical characterization data of targets allows for a more accurate and reliable characterization of the output of semiconductor manufacturing systems.

The disclosed implementations pertain to a variety of manufacturing techniques that use process chambers (that may include deposition chambers, etching chambers, and the like), such as chemical vapor deposition techniques (CVD), physical vapor deposition (PVD), plasma-enhanced CVD, plasma-enhanced PVD, sputter deposition, atomic layer CVD, combustion CVD, catalytic CVD, evaporation deposition, molecular-beam epitaxy techniques, and so on. The disclosed implementations may be employed in techniques that use vacuum deposition chambers (e.g., ultrahigh vacuum CVD or PVD, low-pressure CVD, etc.) as well as in atmospheric pressure deposition chambers. Herein, "light" refers to electromagnetic radiation of any spectral range, including visible, far and near infrared (IR), far and near ultraviolet (UV), etc. "Light" may further include unpolarized (e.g., natural) light, linearly, circularly, or elliptically polarized light, partially-polarized light, focused light, diverging light, collimated light, and so on.

FIG. 1A illustrates one exemplary implementation of a manufacturing machine 100 capable of supporting optical inspection of substrates using spectral shaping. In one implementation, the manufacturing machine 100 includes a loading station (load-lock chamber) 102, a transfer chamber 104, and one or more process chambers 106. The process chamber(s) 106 may be interfaced to the transfer chamber 104 via transfer ports (not shown). The number of process chamber(s) associated with the transfer chamber 104 may vary (with three process chambers indicated in FIG. 1A, as a way of example). The transfer chamber 104 may include a robot 108, a robot blade 110, and an optical inspection tool for accurate optical inspection of a substrate 112. The transfer chamber 104 may be held under pressure (temperature) that is higher (lower) than the atmospheric pressure (temperature). The robot blade 110 may be attached to an extendable arm sufficiently long to move the robot blade 110 into the process chamber 106 to retrieve the substrate in chamber 116 after processing of the substrate is complete.

The robot blade 110 may enter the process chamber(s) 106 through a slit valve port (not shown) while a lid to the process chamber(s) 106 remains closed. The process chamber(s) 106 may contain processing gases, plasma, and various particles used in deposition processes. A magnetic field may exist inside the process chamber(s) 106. The inside of the process chamber(s) 106 may be held at temperatures and pressures that are different from the temperature and pressure outside the process chamber(s) 106.

The optical inspection device with spectral shaping 114 may include (not shown in FIG. 1A) a light source, a light detector, and various optical devices to shape one or more beams of light, as discussed in detail below, in reference to other figures. In some implementations, the beam to be shaped is a beam produced by the light source, and the spectral shaping occurs prior to the beam's incidence on the optical target. In some implementations, a beam to be shaped is a beam reflected from the optical target, and the shaping occurs before the beam is delivered to the light detector. In some implementations, the light sources may be mounted outside the inspection device, e.g., mounted inside (or outside) the transfer chamber 104, the loading station 102, or the process chambers 106. Herein, "optical target" may mean an undeveloped substrate, a fully processed substrate, a partially-processed substrate (including a substrate that is currently being processed, e.g., with deposition or etching techniques), a reference substrate a process kit tool, such as an edge ring (e.g., to determine the degree of wear or misalignment of the edge ring), a calibration device, or the like.

In some implementations, the radiation coming from the substrate 112 may be a reflected radiation generated in response to irradiation of the substrate 112 by the incident light from one or more light sources. The radiation may be reflected substantially from the surface of the substrate, if the substrate material is non-transparent to a specific wavelength being used and the thickness of the substrate exceeds the penetration depth for that wavelength. In other implementations, the reflected radiation may be originating from the entire cross-section of the substrate, such as in situations where the substrate is transparent to the specific wavelength being detected or where the thickness of the substrate is less that the penetration depth of light. In some implementations, the radiation coming from the substrate may be a radiation transmitted through the substrate. For example, the sources of light may be located on one side of the substrate 112 (e.g., above or below the substrate) whereas the light detector(s) may be location on the other side of the substrate 112 (below or above the substrate, respectively). In such implementations, the robot blade 110 may cover only some portions of the bottom surface of the substrate 112, leaving other portions of the bottom surface exposed to facilitate transmission of light across the thickness of the substrate 112.

A computing device 118 may control operations of the robot 108 and the optical inspection device 114, including processing of data obtained by the inspection device 114. The computing device 118 may communicate with an electronics module 150 of the robot 108. In some implementations, such communication may be performed wirelessly.

Figure 1B:
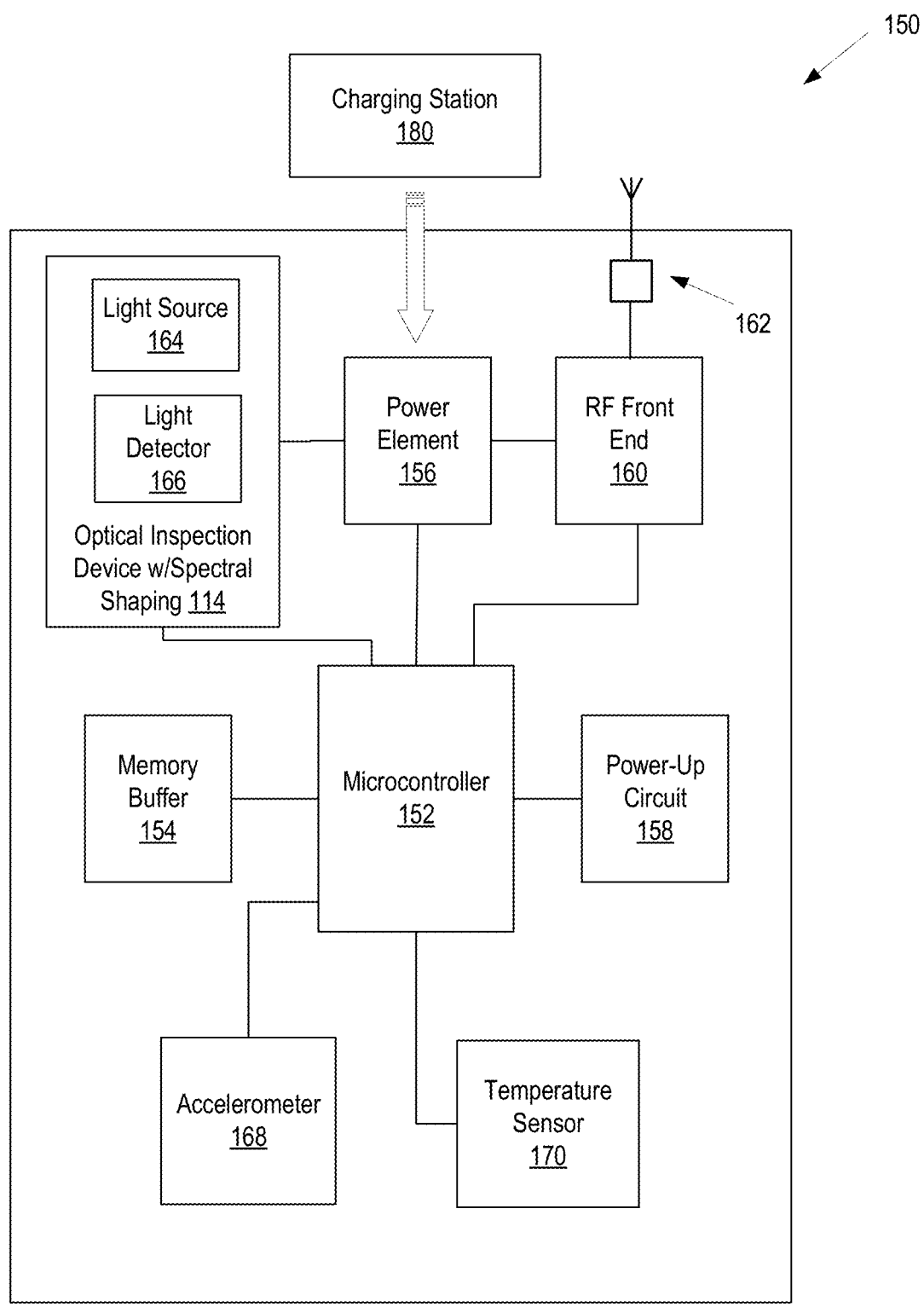
FIG. 1B illustrates the electronics module capable of supporting optical inspection of substrates using spectral shaping inside the manufacturing machine of FIG. 1A, in one exemplary implementation.

FIG. 1B illustrates the electronics module 150 capable of supporting optical measurements of substrates using spectral shaping inside the manufacturing machine 100, in one exemplary implementation. The electronics module 150 may include a microcontroller 152 and a memory buffer 154 coupled to the microcontroller 152. The memory buffer 154 may be used to collect and store optical inspection data before transmitting the inspection data to the computing device 118. In some implementations, the inspection data may be transmitted using a wireless communication circuit. In other implementations, the data may be transmitted using a wired connection between the electronics module 150 and the computing device 118. In some implementations, the optical inspection data may first be stored (buffered) in the memory buffer 154 prior to being transmitted to the computing device 118. In other implementations, the measurement data may be transmitted to the computing device 118 as the data is collected, without being stored in the memory buffer 154. In some implementations, the wireless or wired connection may be continuous. In other implementations, the wireless or wired connection may be established periodically or upon completion of the inspection or upon some other triggering event (e.g., when the memory buffer 154 is close to being full). The electronics module 150 may further include a power element 156 and a power-up circuit 158. In some implementations, the power element 156 may be a battery. In some implementations, the power element 156 may be a capacitor. The power element 156 may be rechargeable from a power station 180. For example, the battery or the capacitor may be recharged upon a contact (e.g., via a charging docking station) with the power station 180. In some implementations, the charging station may be connected (e.g., via a wired connection) to the power element 156. In some implementations, the connection between the charging station 180 and the power element 156 may be wireless. In some implementations, the charging station 180 may include a power transmitter and the power element 156 may include a power receiver. When the power element 156 is low on power, the power element 156 may send a beacon signal to the find the power station 180 and the power station 180 may provide a power signal to the power element 156 until the power element 156 is recharged to the required level.

The microcontroller 152 may be coupled to the optical inspection device 114 which may include a light source 164 and a light detector 166. The light source 164 may be a narrow-band light source, such as a light-emitting diode, a laser, a light bulb, etc. In some implementations, the light source 132 may be a broadband light source. In some implementations, the light source 132 may include more than one light sources, such as multiple narrow-band light sources producing (when added together) a broadband light. The light source 164 may include additional optical elements (such as filters, absorbers, polarizers, etc.) to control a spectral distribution and/or polarization of the produced light. The light detector 164 may include one or more spectrographs, spectrometers, diffraction gratings, mirrors, lenses, photodiodes, and other devices. The light detector 164, alone or in conjunction with the microcontroller 152 and/or the computing device 118 (which may include, e.g., a central processing unit (CPU), a microcontroller, an application-specific integrated circuit (ASIC), a digital signal processor (DSP, a field-programmable gate array (FPGA), or any other type of a processing device), may determine one or more optical responses of the target. The optical responses may include the reflectivity as a function of wavelength $R(\lambda)$, polarization state, including the ratio of two orthogonal polarizations and the phase difference between the two orthogonal polarization as functions of wavelength, or any other optical quantity that may be used to characterize the substrate, such as a polarization dependence of the reflectivity, an angle of rotation of the polarization plane upon reflection, luminescence intensity, and so on.

The electronics module 150 may also include an accelerometer 168 to facilitate accurate extension and angular rotation of the robot blade 110. The electronics module 150 may also include a temperature sensor 170 to detect temperature near the substrate 112. The electronics module 150 may further include a wireless communication circuit, i.e. a radio circuitry for receiving wireless instructions from the computing device 118 and for transmitting optical inspection data to the computing device 118. For example, the radio circuitry may include a radio frequency (RF) front end module 160 and an antenna 162 (e.g., a UHF antenna), which may be an internal ceramic antenna, in one implementation. The batteries may be of a high temperature-tolerant type such as lithium ion batteries that can be exposed to a chamber temperature of 450 degrees C. for short time periods, e.g., ranging from one to eight minutes.

Some components shown in FIG. 1B may be located on or at the stationary part of the robot 108. For example, the microcontroller 152, the memory buffer 154, and the RF front end 160 may be so located. Other components of the electronics module 150 may be located on the robot blade 110. For example, the accelerometer 168, and the temperature sensor 170 may be so located. In some implementations, some of the components of the electronics module 150 may be located both on the stationary part of the robot 108 and the extendable robot blade 110, e.g., a power element 156 may be so located. In some implementations, two separate microcontrollers may be used, with one of the microcontrollers located on the stationary part of the robot 108 and the other microcontroller located on the optical inspection device 114.

The wireless connection facilitated by the RF front end 160 and antenna 162 may support a communication link between the microcontroller 152 and the computing device 118, in some implementations. In some implementations, the microcontroller 152 integrated with the robot 108 may have a minimal computational functionality sufficient to communicate information to the computing device 118, where most of the processing of information may occur. In other implementations, the microcontroller 152 may carry out a significant portion of computations, while the computing device 118 may provide computational support for specific, processing-intensive tasks. Data received by the computing device 118 may be data obtained from the inside of the transfer chamber 104, the process chambers 106, data generated by the optical inspection device, data temporarily or permanently stored in the memory buffer 154, and so on. The data stored in the memory buffer 154 and/or transmitted to or from the computing device 118 may be in a raw or processed format.

In one implementation, the optical measurement device may direct (using the processing capabilities of the microcontroller 152 and/or the computing device 118) one or more light beams produced by the light source 164 to one or more locations on the surface of the substrate 112 (in some implementations, while the substrate is being transported by the robot blade 110). The optical inspection device 114 may collect reflected light data, and the microcontroller 152 and/or the computing device 118 may determine, based on the reflected light data, one or more characteristics of the substrate 112, such as refractive index, optical attenuation (imaginary part of the refractive index), film thickness, critical dimensions, and so on. The microcontroller 152 (or computing device 118) may then output (and store in the memory buffer 154) one or more characteristics of representative of a quality of the substrate 112, such as a thickness of the film stacks and critical dimensions of the patterns on the substrate 112, characterizing uniformity, smoothness, absence of contaminants, etc. In some implementations, the reflected light data may include information about polarization of the reflected light whereas the light incident on the surface of the substrate may be linearly (circularly, elliptically) polarized (e.g., s-polarized light or p-polarized).

Figure 10:
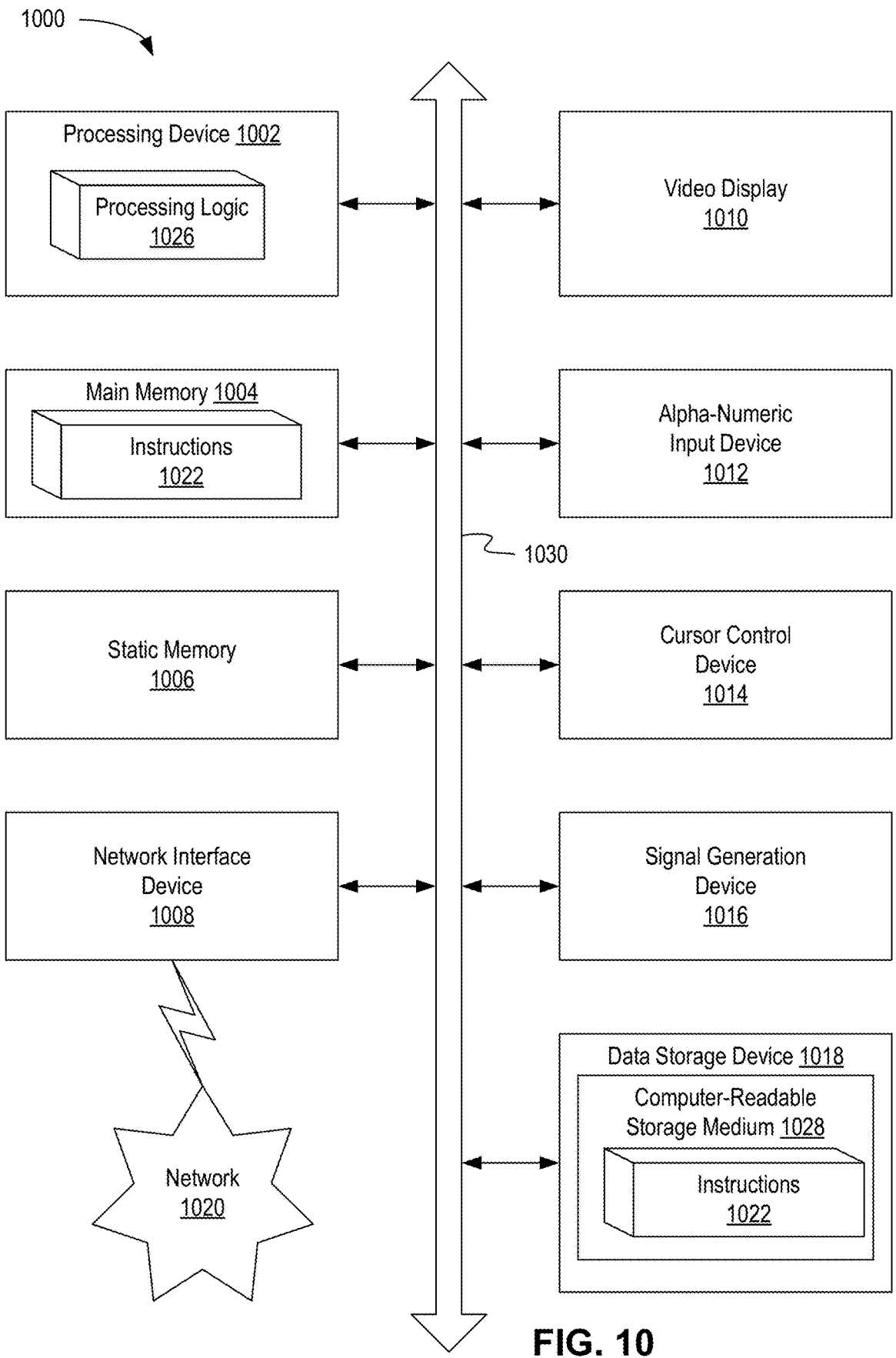
FIG. 10 depicts a block diagram of an example processing system capable of supporting real-time detection of particulate contaminants present inside a deposition chamber, based

The computing device 118 of the manufacturing machine 100 may include a blade control module 120, an inspection control module 122 (to control operations of the light sources and optical sensors), and a substrate quality control module 124, in one implementation, as well as a central processing unit (CPU), software, and memory (as shown in FIG. 10). In some implementations, some of the functionality of the blade control module 120, the inspection control module 122, and the substrate quality control module 124 may be implemented as part of the electronics module 150 by the microcontroller 152 and the memory buffer 154.

FIG. 2A illustrates schematically a sequence of transformations 200 to perform spectral shaping of an input light beam for precise optical characterization of targets within device manufacturing systems, in accordance with some implementations of the present disclosure. For the sake of concreteness, FIG. 2A (and subsequent figures) refers to a substrate 250, but it should be understood that any other target may be used in place of the substrate 250. Although the instant disclosure references process chambers, the implementations disclosed herein may be used in any other optical systems and methods where spectral shaping may be advantageous.

In one exemplary implementation, the light source 202 may produce an input light beam 204 that, prior to being output to the substrate 250, may undergo a series of transformations, such as transformations 210-240. Each transformation, indicated by a block in FIG. 2A, may be facilitated by one or more hardware devices (including various optical elements), as described in more detail in reference to subsequent figures. The input beam 204 may be characterized by specifying the beam's spectral content, e.g., its intensity profile $I(\lambda)$. In some implementations, a continuous intensity profile $I(\lambda)$ may be used. In some implementations, a discrete intensity profile $I(\lambda_j)$ may be used by specifying intensity at a sequence of central wavelengths $\lambda_j = \lambda_1, \lambda_2, \lambda_3$, for multiple spectral ranges $\Delta\lambda$, such as spectral ranges of width $\Delta\lambda = 100$ nm (or 150 nm, 200 nm or any other ranges of wavelengths). In some implementations, $\Delta\lambda$ may be equal to the distance between the central wavelengths (e.g., $\Delta\lambda = \lambda_3 - \lambda_2$). In some implementations, the ranges may be overlapping with $\Delta\lambda$ being greater than the distance between the adjacent central wavelengths. In some implementations, $\Delta\lambda$ may be greater than the distance between the central wavelengths (so that the ranges are non-overlapping). In some implementations, the ranges $\Delta\lambda$ may have unequal widths. (For example, the ranges may correspond to equal frequency intervals, $\Delta f$.) In some implementations, $\Delta\lambda$ may be taken small (e.g., 1-10 nm) so that the description of the input beam 204 in terms of the set of discretized values profile $I(\lambda_j)$ is quasi-continuous. In some implementations, the ranges $\Delta\lambda$ may correspond to the actual emission ranges of various light emitters of the light source 164 (e.g., emission ranges of light-emitting diodes of the light source 164). In other implementations, the ranges $\Delta\lambda$ may be defined for characterization purposes only and may not be tied to any specific physical light emitters.

In some implementations, the input beam 204 may undergo spatial dispersion (transformation 210), using one or more dispersive optical elements (prisms, diffraction gratings, waveguide openings, optical fiber tips, and the like), into a set of spectral beams corresponding to the respective central wavelengths $\lambda_j$, each traveling along a separate optical path. In reality, of course, there may be a continuous spatial distribution of light frequencies (wavelength), so that there is no sharp boundary (in frequency or in space) between various spectral beams. "Spectral beams" shall be understood to serve as descriptors of continuous light intensity distributions. For example, spectral components within the range $\Delta\lambda$ centered at $\lambda_j$ may propagate along an optical path that has some central line and a spatial extent. The spatial extent may be described by a half-width of the total intensity of the j-th spectral beam, $$I_j(y) = \sum_{\lambda=\lambda_j-\Delta\lambda/2}^{\lambda_j+\Delta\lambda/2} I(\lambda, y)$$

with respect to the lateral coordinate(s) y. The centerline $y_j(x)$ obtained as a line of points that divide the spatial width of the j-th spectral beam (for various coordinates x along the direction of the spectral beam propagation) may be used for quantitative characterization of the spectral beam propagation.

Figure 2C:
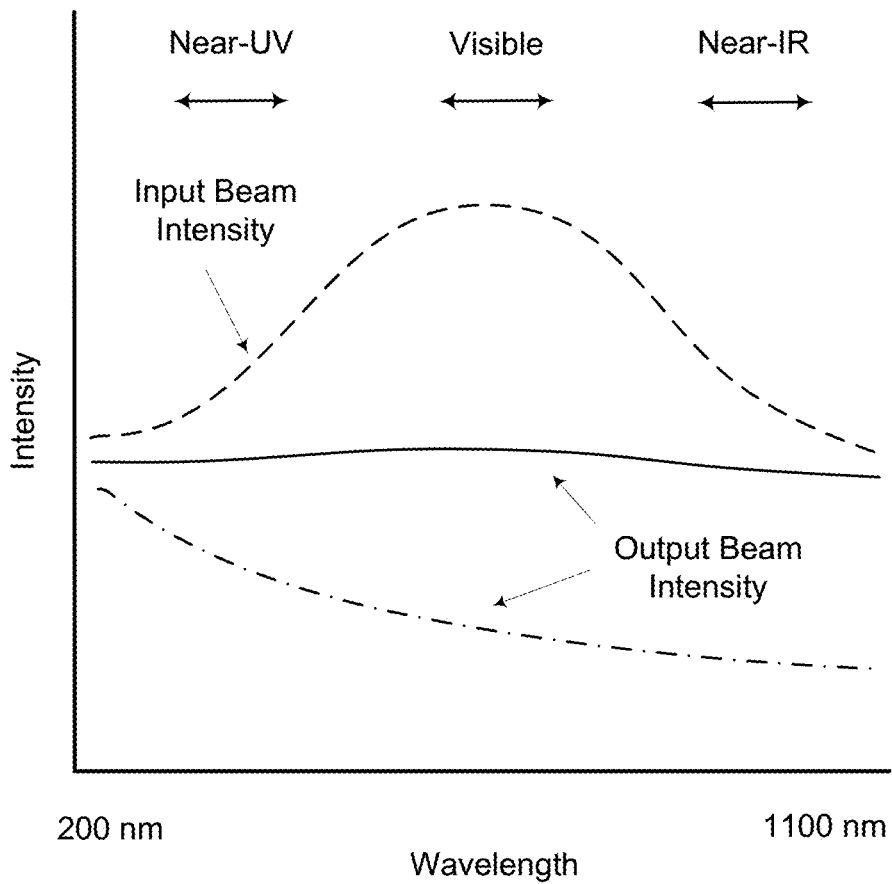
FIG. 2C shows schematic depictions of the input beam intensity (prior to spectral shaping) and the output beam intensity (after spectral shaping) as a function of the wavelengths λ ranging from near-UV to near-IR, in accordance with some implementations of the present disclosure.
Figure 2D:
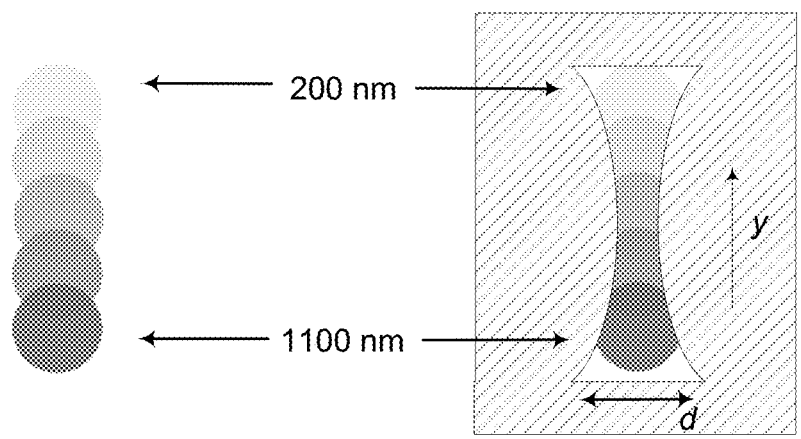
FIG. 2D illustrates how spectral shaping may be achieved using a variable-width aperture d(y), in accordance with some implementations of the present disclosure.

The set of obtained spectral beams may then undergo spectral shaping (transformation 220). For example, the set of spectral beams may pass through an aperture having a variable width d(y) so that a portion of each spectral beam is let through. By virtue of the spatial separation of the beams, the portion transmitted through the aperture may be a function of the wavelength $\lambda$. In some implementations, the spectral shaping 220 may be performed to reduce the spectral dependence of the total intensity. Shown in FIG. 2C are schematic depictions of the input beam intensity (prior to spectral shaping) and the output beam intensity (after spectral shaping) as a function of the wavelengths $\lambda$ ranging from near-UV to near-IR (such as a range of 200-1100 nm, in one example). The dashed line indicates spectral intensity of the input beam 204. As shown by the solid line indicating spectral intensity of the output beam 242, after spectral shaping 220, the intensity profile becomes significantly more uniform. FIG. 2D illustrates how spectral shaping may be achieved using a variable-width aperture d(y), in accordance with some implementations of the present disclosure. More specifically, the width may be such that most of the spectral components in the IR and UV range pass through the aperture virtually unobstructed whereas the visible range components are partially screened out. The aperture shown in FIG. 2D is intended to illustrate one exemplary implementation. In some implementations, the shape of the aperture may be different. For example, it may be advantageous to produce an output beam 242 with a non-uniform spectral intensity, e.g., as depicted with the dot-dashed line in FIG. 2C (e.g., to anticipate enhanced losses that may occur in the UV part of the spectrum during reflection of the output beam from the optical target and during the beam's subsequent propagation from the optical target to the light detector). To achieve such intensity profile, the size of the aperture may be further decreased for visible spectral components.

With a continuing reference to FIG. 2A, the spectrally shaped output beam 242 may be used to illuminate the substrate 250. The beam reflected from the substrate 250 may be carried to the light detector 260 (e.g., via one or more optical fibers) for spectroscopic analysis. In some implementations, after spectral shaping, one or more optical devices may perform beam reformation (transformation 240). Specifically, the spatially separated spectral beams may be combined (using one or more compensating dispersive elements) into a single beam to decrease the spatial extent of the output beam 242. The reduced spatial extent of the beam may have an advantage of allowing to probe the same spot on the target surface of the substrate 250 with different wavelength. In some implementations, where increased spatial resolution of the optical characterization of the target is not critical, the beam reformation 240 may be optional (as indicated by the dashed line) and may not be performed.

Whereas FIG. 2A illustrates delivery of a light beam to the substrate 250, FIG. 2B illustrates schematically a sequence of transformations 270 to perform spectral shaping of the light beam reflected from the substrate, in accordance with some implementations of the present disclosure. In the implementation shown in FIG. 2B, the input beam 204 is a beam reflected from the substrate 250 and the output beam 242 is delivered to the light detector 260. As in FIG. 2A, beam reformation 240 may be optionally performed, in some implementations. Because of the linear nature of the reflection from the substrate 250 (where different spectral components interact independently with the material of the substrate), implementations depicted in FIG. 2A and FIG. 2B may lead to substantially the same results. But in various specific designs, one or the other setup may be preferred.

Figure 3:
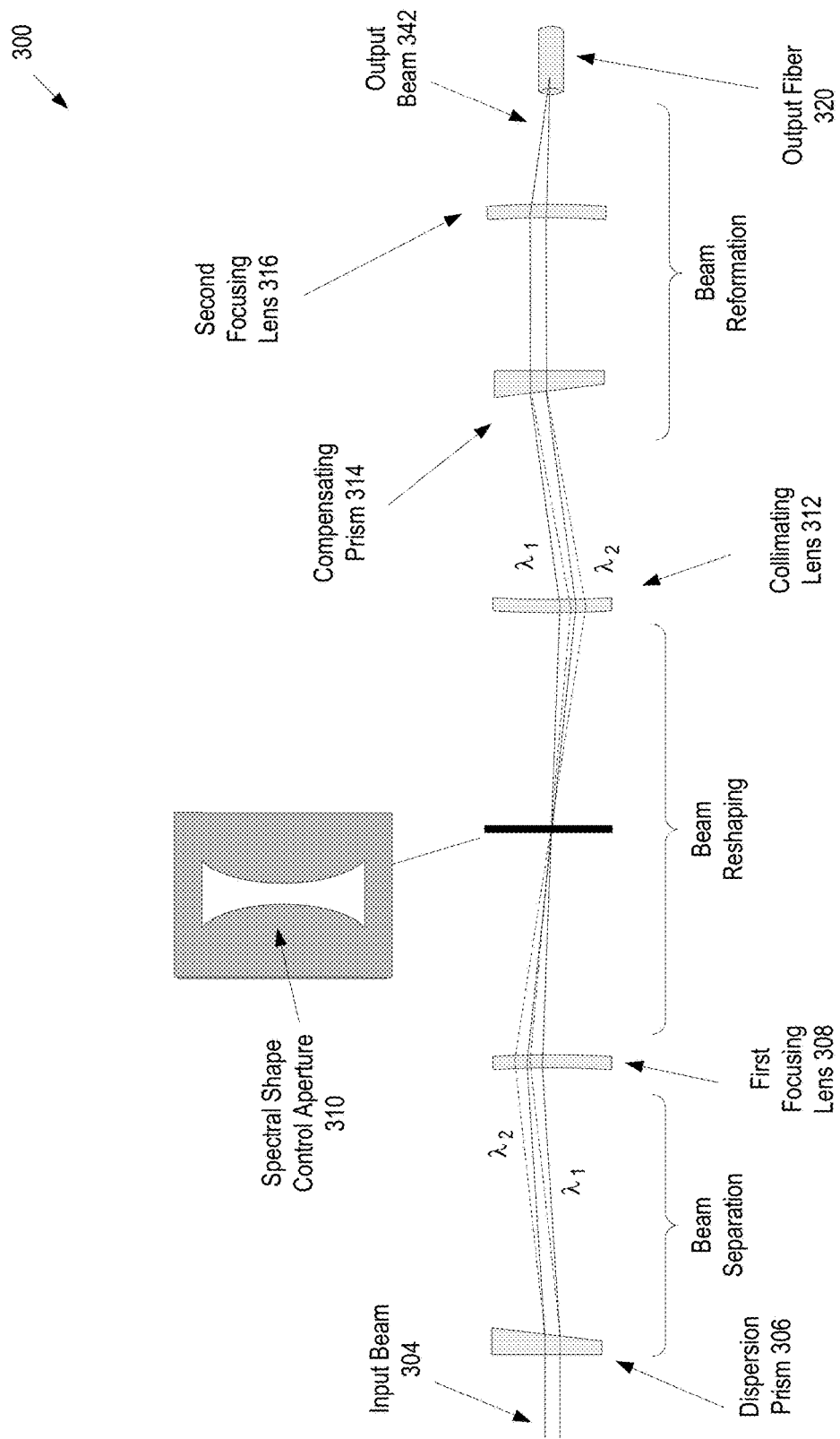
FIG. 3 is an exemplary illustration of an optical system capable of performing spectral shaping of an input light beam for precise optical characterization of targets within device manufacturing systems, in accordance with some implementations of the present disclosure.

FIG. 3 is an exemplary illustration of an optical system 300 capable of performing spectral shaping of an input light beam for precise optical characterization of targets within device manufacturing systems, in accordance with some implementations of the present disclosure. In some implementations, an input beam 304 (delivered with an optical fiber or over atmosphere) may be incident on a dispersion prism 306. The dispersion prism 306 may be made of any transparent material having index of refraction $n(\lambda)$ that depends on the wavelength $\lambda$. In some implementations, the material may be selected based on the index of refraction having imaginary part (describing light absorption within the material) $n''(\lambda)$ that is small in the range of wavelengths whose relative representation in the spectrum of the output light is to be increased. Each of the spectral beams formed by the dispersion prism 306 may be collimated (as indicated by the parallel solid lines for wavelength $\lambda_1$ and by the parallel dashed lines for wavelength $\lambda_2$).

In some implementations, after spatial separation of various spectral components, a first focusing lens 308 may change directions of various spectral beams to cause the spectral beams to pass through a spectral shape control aperture (SSCA) 310, as depicted schematically in FIG. 2D. The SSCA 310 may reduce intensity of each input spectral beam to a degree required to obtain a desired (e.g., predetermined) output intensity of each of the spectral beams. In some implementations, after passing through the aperture, the spectral components may pass through a collimating lens 312 to form a set of collimated beams (as again indicated by the parallel solid and dashed lines). A second (compensating) prism 314 may be used to form the set of collimated spectral beams into a single output beam 342.

In some implementations, the first focusing lens 308 and the collimating lens 312 may be lenses having the same focal distances and placed at equal distances from the SSCA 310. In other implementations, the lenses 308 and 312 may have different focal distances and placed at unequal distances from the SSCA 310. In some implementations, the dispersion prism 306 may be identical to the compensating prism 314 (albeit oriented in the reverse manner) and placed at the same distance from the SSCA 310.

In some implementations, the output beam 342 may be (optionally) directed through a second focusing lens 316 to focus the output beam 342 near an opening of an output fiber 320. The output fiber 320 may then deliver the output beam 342 (having reshaped spectral profile) to an optical target (as shown in FIG. 2A) or the light detector (as shown in FIG. 2B). In some implementations, where there is no second focusing lens 316, the corresponding delivery may be performed over air (or atmosphere).

In various implementations, the SSCA 310 may have a spatial extent (along they direction) of 5-20 mm and a width of the aperture within the 10 um-1 mm range, although in some implementations the width may be lesser or greater than this range. In some implementations, to achieve optimal performance, the minimum width of the aperture may be at least ten times the longest wavelength used for optical characterization of targets, to be remain sufficiently far above the diffraction limit.

Figure 4A:
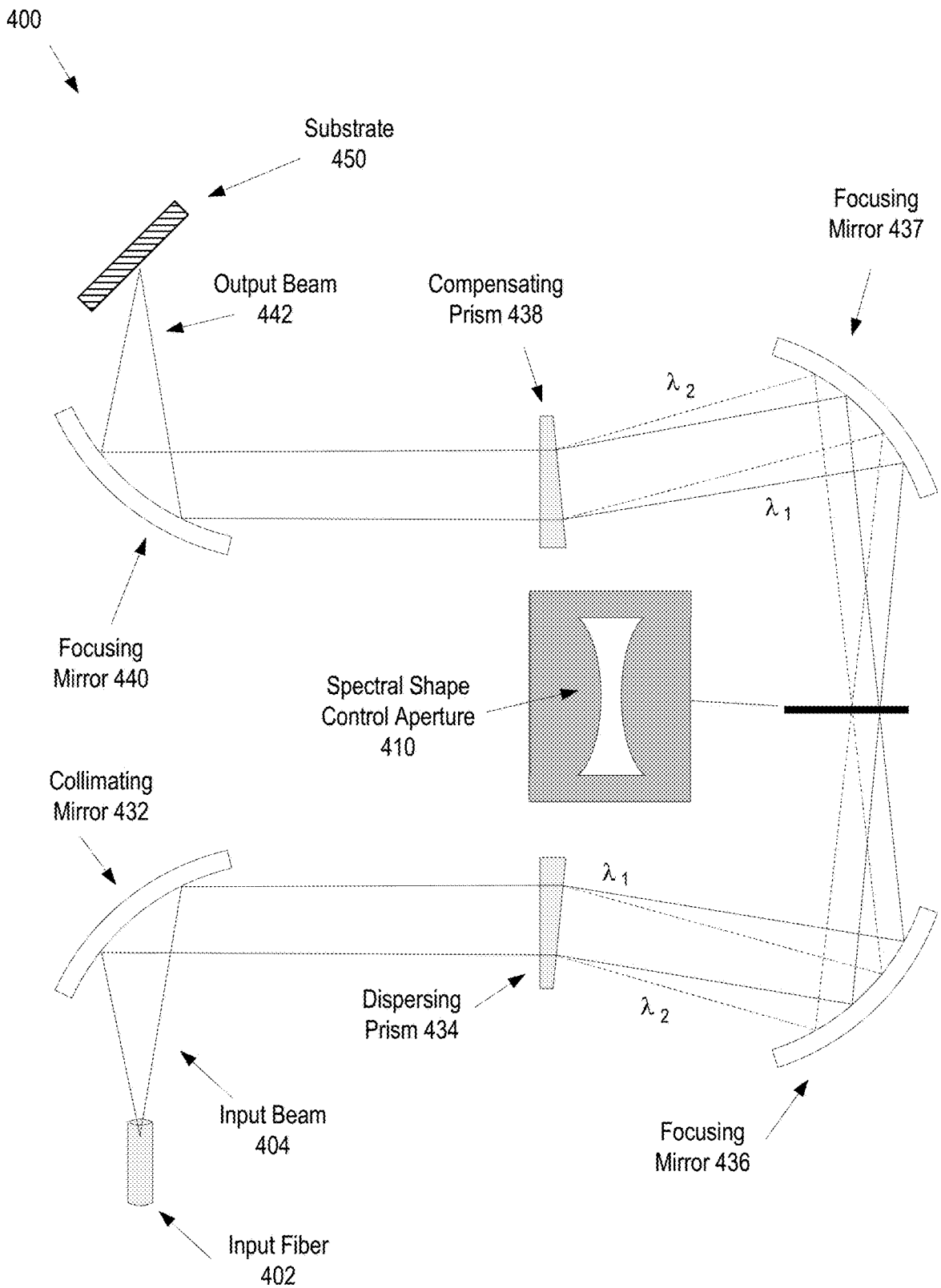
FIG. 4A is an exemplary illustration of an optical system that deploys mirrors and is capable of performing spectral shaping of an input light beam for precise optical characterization of targets within device manufacturing systems, in accordance with some implementations of the present disclosure.

FIG. 4A is an exemplary illustration of an optical system 400 that deploys mirrors and is capable of performing spectral shaping of an input light beam for precise optical characterization of targets within device manufacturing systems, in accordance with some implementations of the present disclosure. In the implementation depicted, the input beam 404 delivered by an input fiber 402 (e.g., from the light source 164) is collimated by a collimating mirror 432 prior to passing through a dispersion prism 434. A focusing mirror 436 then focuses the spatially separated spectral beams at a SSCA 410. The portions of the spectral beams, which pass through the SSCA 410, are subsequently directed to a second focusing mirror 437. The second focusing mirror 437 produce a set of collimated spectral beams that are output to a compensating prism 438 to combine different spectral beams into a single collimated beam. The third focusing mirror 440 may then focus the resulting output beam 442 to an optical target (e.g., substrate 450).

Figure 4B:
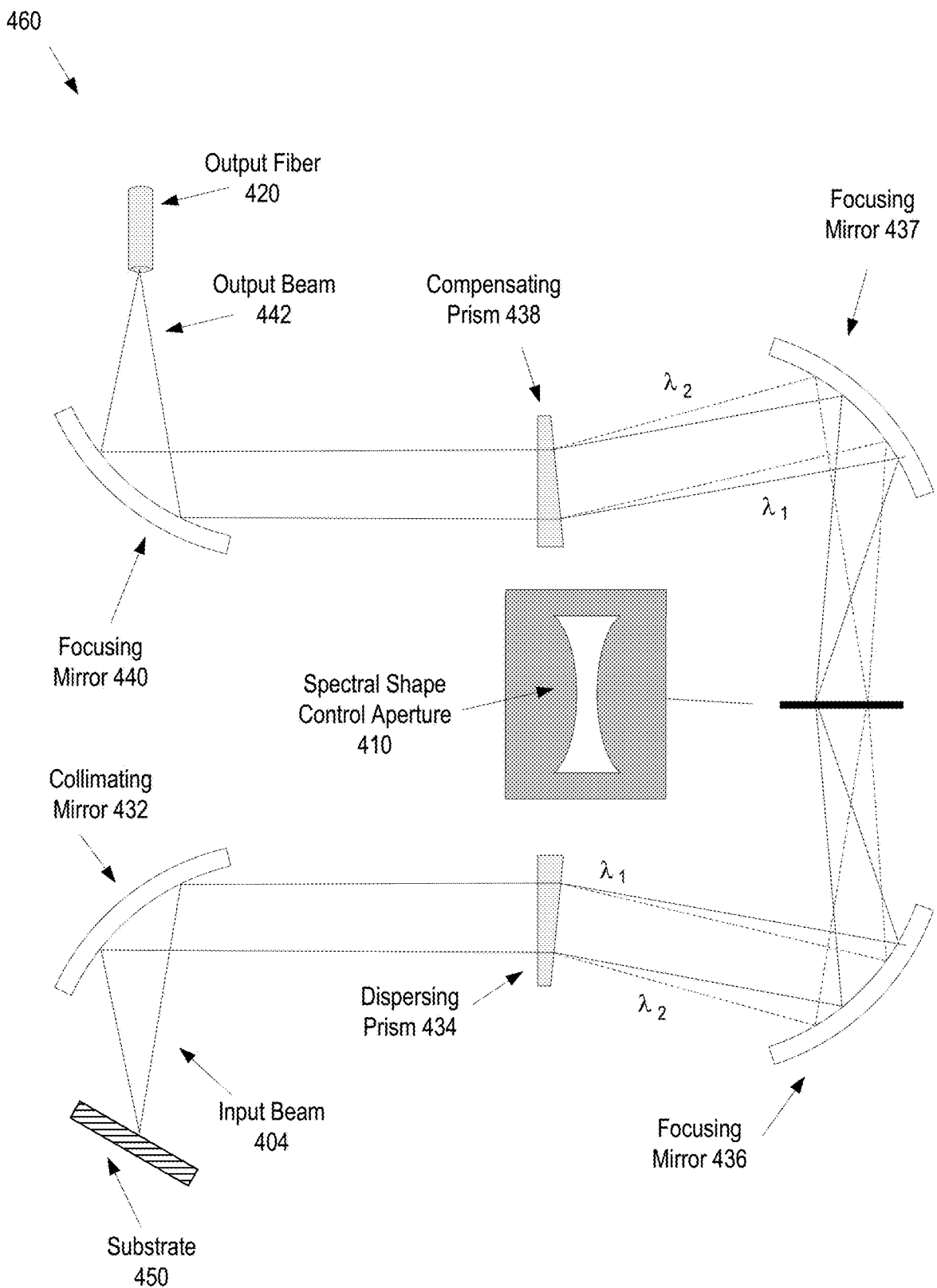
FIG. 4B is an exemplary illustration of another optical system that deploys mirrors and is capable of performing spectral shaping of an input light beam for precise optical characterization of targets within device manufacturing systems, in accordance with some implementations of the present disclosure

FIG. 4B is an exemplary illustration of another optical system 460 that deploys mirrors and is capable of performing spectral shaping of an input light beam for precise optical characterization of targets within device manufacturing systems, in accordance with some implementations of the present disclosure. In contrast to the implementation of FIG. 4A, where the input beam 404 is produced by the light source and the output beam 442 is directed at the substrate 450 (or another target), in the implementation of FIG. 4B, the input beam 404 is produced upon reflection of an incident light by the substrate 450 (or another target) and the output beam 442 is collected by an output fiber 420. The output fiber 420 may then deliver the output beam to a light detector 166, in some implementations.

The implementations that deploy mirrors, as illustrated in FIGS. 4A-B, may possess certain advantages over implementations that deploy lenses, as illustrated in FIG. 3. In particular, reflection from high-quality mirrors may be free from dispersion (unlike refraction through lenses where at least some amount of chromatic aberration is always present). Accordingly, the implementations that utilize mirrors may introduce fewer chromatic distortions during spectral shaping compared with lens-based devices. In some implementations, a combination of lenses and mirrors may be used.

Figure 5A:
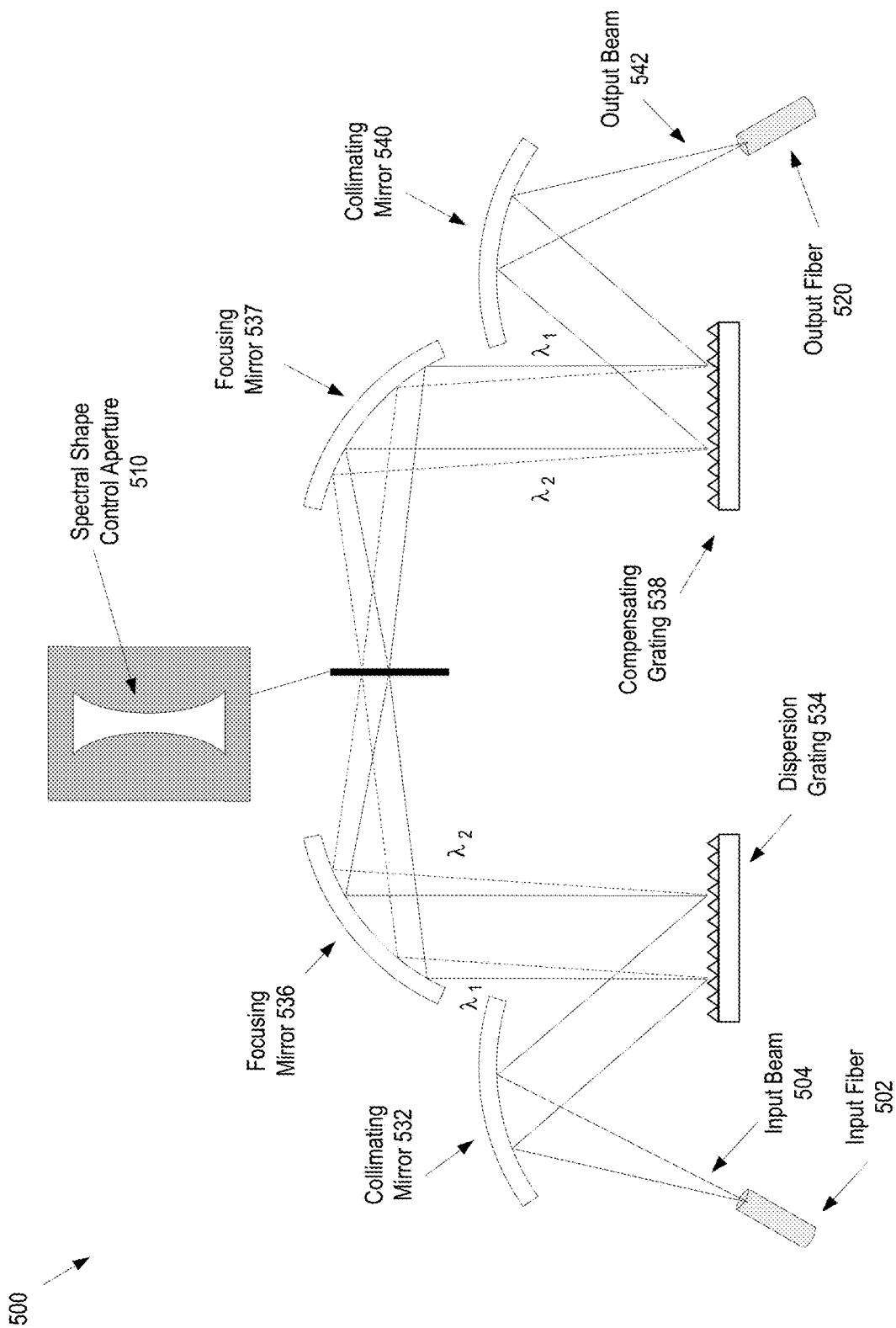
FIG. 5A is another exemplary illustration of an optical system that deploys diffraction gratings and is capable of performing spectral shaping of an input light beam for precise optical characterization of targets within device manufacturing systems, in accordance with some implementations of the present disclosure.

FIG. 5A is another exemplary illustration of an optical system 500 that deploys diffraction gratings and is capable of performing spectral shaping of an input light beam for precise optical characterization of targets within device manufacturing systems, in accordance with some implementations of the present disclosure. In the implementation depicted, an input beam 504 delivered by an input fiber 502 (e.g., obtained from the light source 164 or reflected from the target), is collimated by a collimating mirror 532 and directed to a dispersion grating 534. After undergoing diffraction at the dispersion grating 534, the light separates into a set of collimated spectral components propagating along different directions, as shown schematically. A focusing mirror 536 focuses the spatially separated spectral components (beams) at a SSCA 510. The portions of the spectral beams, which pass through the SSCA 510, are subsequently directed to a second focusing mirror 537. The second focusing mirror 537 may produce a set of collimated spectral beams that are output to a compensating grating 538 to combine different spectral components into a single collimated beam. A collimating mirror 540 may then focus the resulting output beam 542 to an output fiber 520 (to deliver the output beam to the target or the light detector).

Figure 5B:
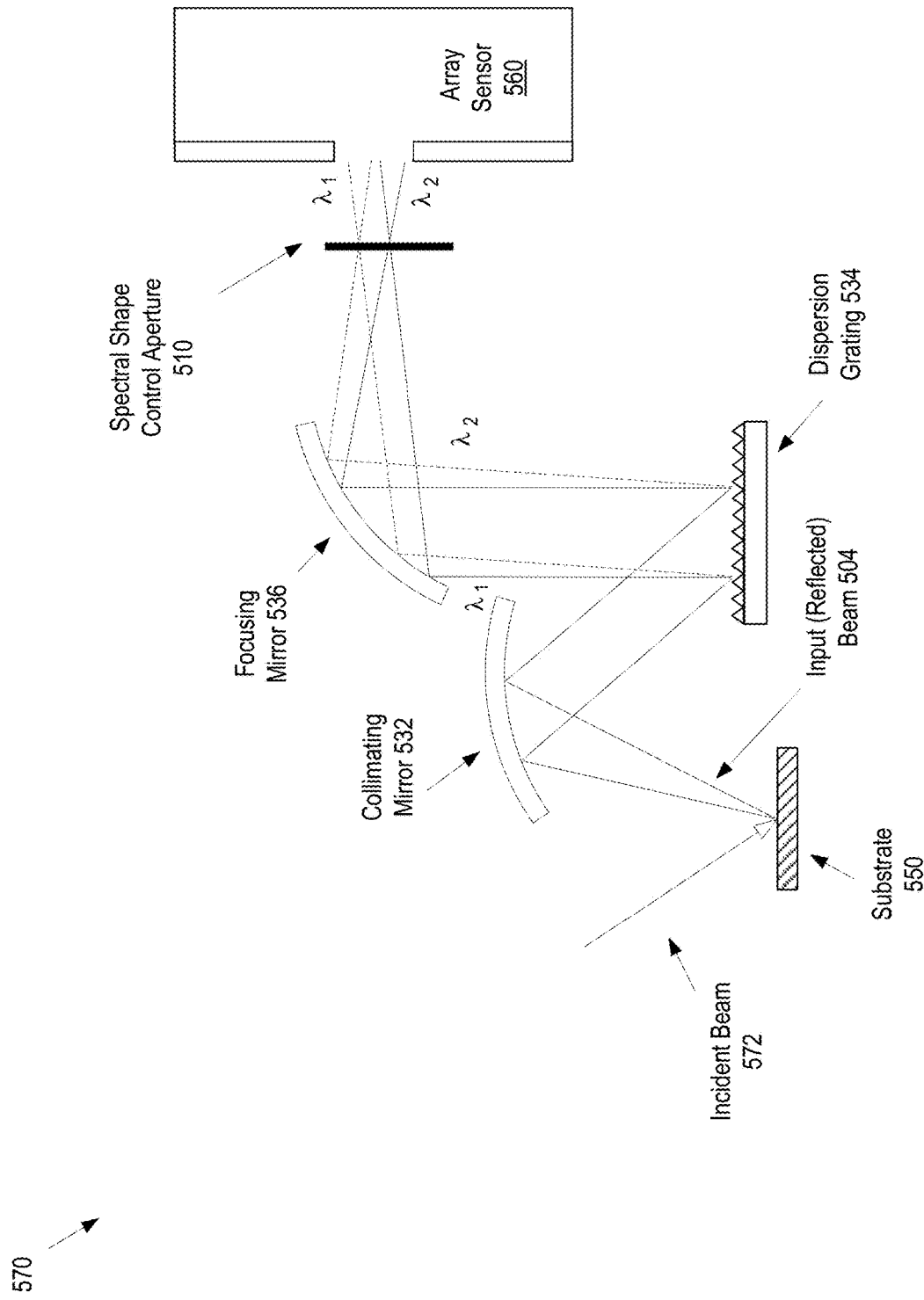
FIG. 5B is an exemplary illustration of a simplified optical system that deploys a diffraction grating and is capable of performing spectral shaping of an input light beam for precise optical characterization of targets within device manufacturing systems, in accordance with some implementations of the present disclosure.

FIG. 5B is another exemplary illustration of a simplified optical system 570 that deploys a diffraction grating and is capable of performing spectral shaping of an input light beam for precise optical characterization of targets within device manufacturing systems, in accordance with some implementations of the present disclosure. In the implementation illustrated in FIG. 5C, no beam reformation is performed. Specifically, the input beam 504 is a reflected beam generated by the substrate 550 in response to an incident beam 572 directed at the substrate 550 (e.g., by the light source 164). After the set of spectral components is focused by the focusing mirror 536 and spectrally shaped by the SSCA 510, the spectral components can be output to an optical detecting device, such as an array sensor 560, directly, without beam reformation. Such implementation may be advantageous if the array sensor 560 has a wide spatial sensitivity and is capable of accurately determining spectral intensity of incoming light that has an extended spatial extent. For example, chromatic sensors for detection of various spectral components may be located at the points where the corresponding spectral components enters the array sensor 560. In the depiction of FIG. 5B, the light output by the focusing mirror 536 is focused at or near the SSCA 510. In some implementations, however, the light may be focused at or near the opening (or at or near the chromatic sensors) of the array sensor 560. In some implementations, the array sensor 560 may be a linear array sensor.

The implementations that deploy gratings, as illustrated in FIGS. 5A-B, may possess some advantages over implementations that deploy prisms, as illustrated in FIGS. 3 and 4A-B. In particular, dispersion gratings may allow for a more accurate control of spatial separation of various spectral components of light, since directions of diffraction maxima and minima are determined by a geometry of the diffraction setup (e.g., distance between the diffraction gratings 534 and 538, grating pitch, angles of light incidence) rather than on material parameters (such as a dispersion of the refractive index) of the prisms.

In some implementations, depending on the type of source (and the type of produced input beam) as well as a desired target spectral content of the output beam, a set of fixed pre-formed apertures (e.g., SSCAs 410, 510, or 610) may be used with the spectral shaping device. In some implementations, the aperture used for shaping of spectral beams may be adjustable in width and/or length. For example, the aperture may be an device having multiple linear blades (straight or curved) whose positions may be controlled manually (by a human operator) or by a processing device (e.g., computing device 118 and/or microcontroller 152). Depending on the number of blades, repositioning the blades that form the aperture may provide for a quasi-continuous control of the aperture profile d(y).

Figure 5C:
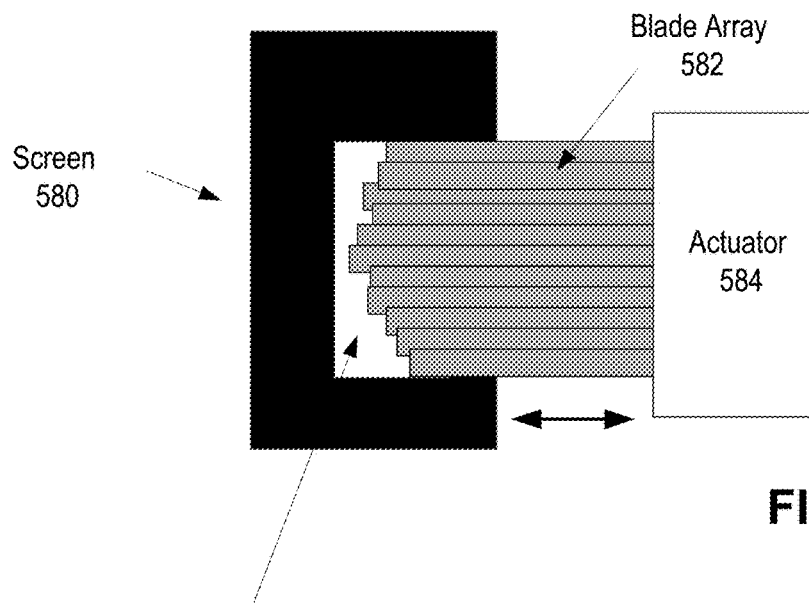
FIG. 5C illustrates one exemplary implementation of a spectral shape control aperture formed by a blade array, in accordance with some implementations of the present disclosure.

FIG. 5C illustrates one exemplary implementation of a spectral shape control aperture formed by a blade array, in accordance with some implementations of the present disclosure. As depicted schematically, the SSCA may be formed in a (non-transparent) screen 580 by an array of movable blades 582. The positions of the movable blades 582 may be adjusted via an actuator 584. For example, in the implementation shown in FIG. 5C, each individual blade may be moved along the horizontal direction until a target shape (the white opening) of the SSCA 510 is obtained. In other implementations, individual blades of the blade array 582 may be moved along more than one direction, e.g., along both the horizontal and the vertical directions, or along some combination thereof. The actuator 584 may operate according to instructions output by the computing device 118 and/or the microcontroller 152, to which the actuator 584 may be communicatively coupled.

Figure 5D:
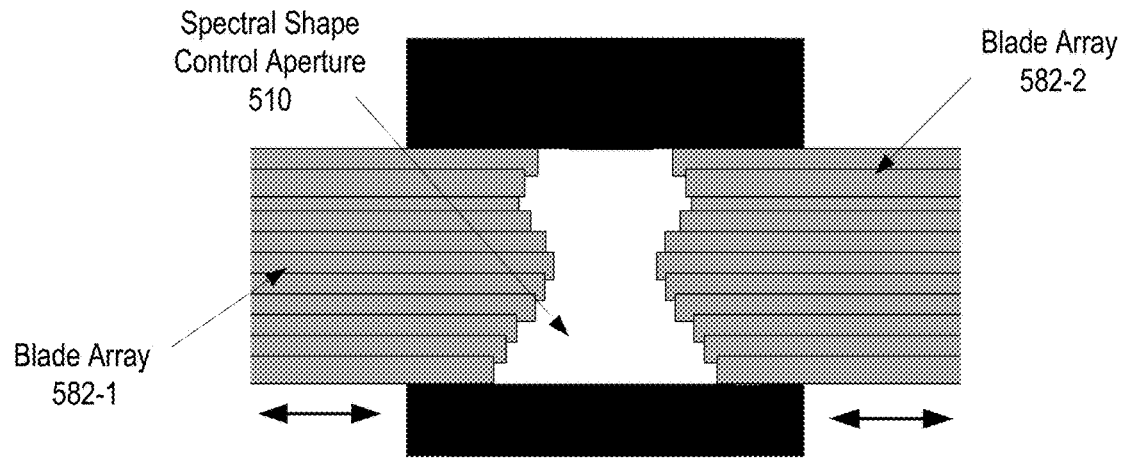
FIG. 5D illustrates schematically another exemplary implementation of a spectral shape control aperture formed by a double blade array, in accordance with some implementations of the present disclosure.
Figure 5E:
FIG. 5E depicts some exemplary non-limiting shapes of SSCAs which may be obtained using devices depicted in FIGS. 5C-D, in accordance with some implementations of the present disclosure.

FIG. 5D illustrates schematically another exemplary implementation of a spectral shape control aperture formed by a double blade array, in accordance with some implementations of the present disclosure. As shown in FIG. 5D, two blade arrays 582-1 and 582-2 may be used to form SSCAs of arbitrary shapes. In some implementations, the blade arrays 582-1 and 582-2 may be operated by independently controlled actuators (not shown), to facilitate formation of arbitrary non-symmetric SSCA shapes. In some implementations, the blade arrays 582-1 and 582-2 may be operated by a single actuator, e.g., in such a way that the blades in the blade array 582-1 are extended to the same distances as the blades in the blade array 582-2 towards each other, so that a symmetric (with respect to the center line) SSCA 510 is formed. FIG. 5E depicts some exemplary non-limiting shapes of SSCAs which may be obtained using devices depicted in FIGS. 5C-D (or via other means), in accordance with some implementations of the present disclosure.

Figure 6A:
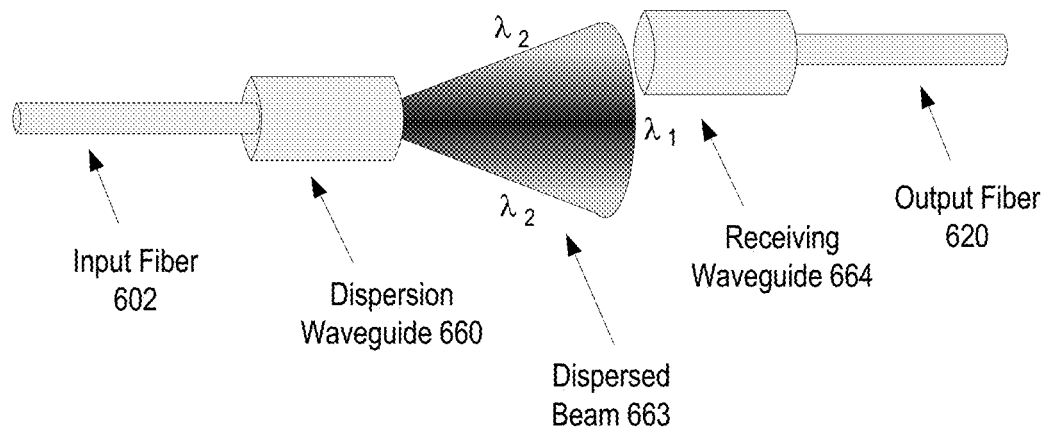
FIGS. 6A-C show exemplary implementations of a spectral shaping device that deploys optical elements whose axes are laterally offset relative to each other to facilitate spectral shaping of an input light beam for precise optical characterization of targets within device manufacturing systems, in accordance with some implementations of the present disclosure.
Figure 6B:
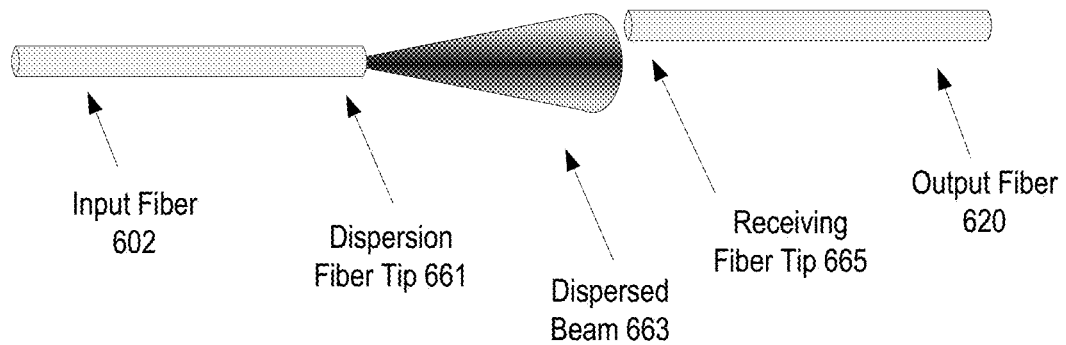

FIGS. 6A-B show exemplary implementations of a spectral shaping device that deploys optical elements whose axes are laterally offset relative to each other to facilitate spectral shaping of an input light beam for precise optical characterization of targets within device manufacturing systems, in accordance with some implementations of the present disclosure. FIG. 6A depicts an input fiber 602, which may deliver an input beam of light to a dispersion waveguide 660. The dispersion waveguide 660 may be made of a conducting material, in some implementations. In some implementations, the dispersion waveguide 660 may be made of a dielectric material. In some implementations, the dispersion waveguide 660 may be hollow. In some implementations, the dispersion waveguide 660 may be solid (non-hollow). The dispersion waveguide 660 may have a cylindrical, elliptic, rectangular, or polygonal shape. The dispersion waveguide 660 may have a fixed cross section along the length of the waveguide or may have a cross section that varies along the length of the waveguide (e.g., the dispersion waveguide 660 may be a tapered waveguide). The dispersion waveguide 660 may have an opening to disperse light into an outside space, as indicated schematically by a dispersed beam 663. The opening may be any type of waveguide termination, including an abrupt cut, or a gradual opening characterized by a cross section that varies near the opening (e.g., the cross section may be increasing or decreasing near the opening). As a result of the emergence of light from the opening and the interaction of light with the walls of the dispersion waveguide 660 near the opening (such as diffraction, scattering, reflection, refraction), the beam dispersed from the opening may include a plurality of spectral components propagating along different spatial directions. For example, as schematically depicted in FIG. 6 by the varying intensity of the shading of the dispersed beam 663, components that predominantly propagate along the axis of the dispersion waveguide 660 may have different (e.g., larger) wavelengths that those components that propagate away from the axis, (e.g., $\lambda_1 > \lambda_2$).

In some implementations, the opening of the dispersion waveguide 660 may be specifically designed to increase the dispersion of light and, correspondingly, to increase the spread of the spectral components (spectral beams) that constitute the dispersed beam 663.

Portion of each of the spectral beams may be collected by a receiving waveguide 664. The receiving waveguide 664 may be facing the dispersion waveguide 660. The receiving waveguide 664 may be positioned so that the axes of the receiving waveguide 664 and the dispersion waveguide 660 are laterally offset relative to each other. In the implementation illustrated in FIG. 6A, a larger portion of spectral components with shorter wavelengths (which have stronger dispersion) $\lambda_2$, such as UV components, is collected by the receiving waveguide 664 than a portion of spectral components with longer wavelengths Xi, such as visible range components. In various implementations, the lateral offset may be adjustable, depending on the desired spectral shaping. In some implementations, the lateral offset may be absent (so that the axes of the two waveguides 660 and 663 coincide). For example, the lateral offset may be decreased or set to zero if a relative weight of the IR part of the spectrum needs to be increased at the expense of the visible and/or UV ranges. The light collected by the receiving waveguide 664 may be delivered to the target (or the light detector) by an optical fiber 620.

FIG. 6B depicts a simplified spectrum shaping device of FIG. 6A, in which a tip 661 of the input fiber 602 serves as the dispersion waveguide 660 and a tip 665 of the input fiber 602 serves as the receiving waveguide 664. In some implementations, the dispersion fiber tip 661 and/or the receiving fiber tip 665 are simple cuts of the corresponding fibers 602 and 620. In some implementations, the dispersion fiber tip 661 and/or the receiving fiber tip 665 may have cross sections that vary along the corresponding fibers 602 and 620.

Figure 6C:
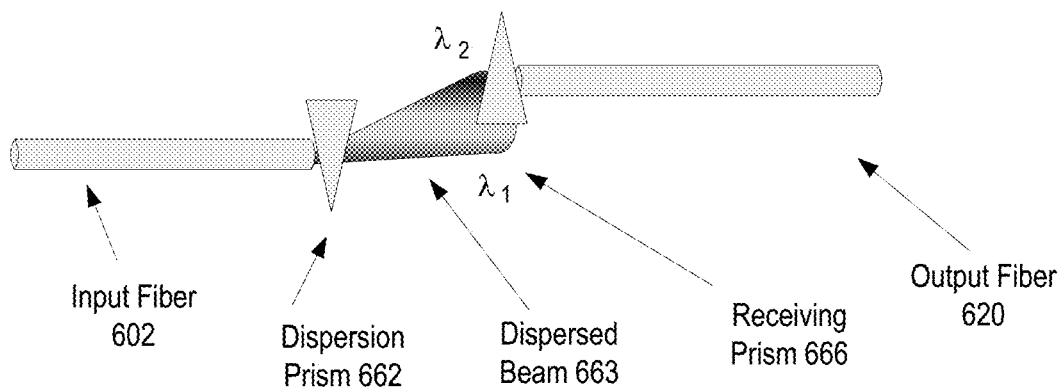

FIG. 6C depicts another implementation of a spectrum shaping device that deploys a dispersion prism 662 in place of the dispersion waveguide 660 and a receiving prism 666 in place of the receiving waveguide 664. The dispersion prism 662 may produce the dispersed beam whereas the lateral offset of the receiving prism 666 may be set so that a desired portion of the spectral components is captured by the receiving prism 666. For example, the offset may be such that most of the UV components $\lambda_2$ are captured (and guided to the output fiber 620) whereas a significant portion of the visible range Xi components is not.

Figure 7A:
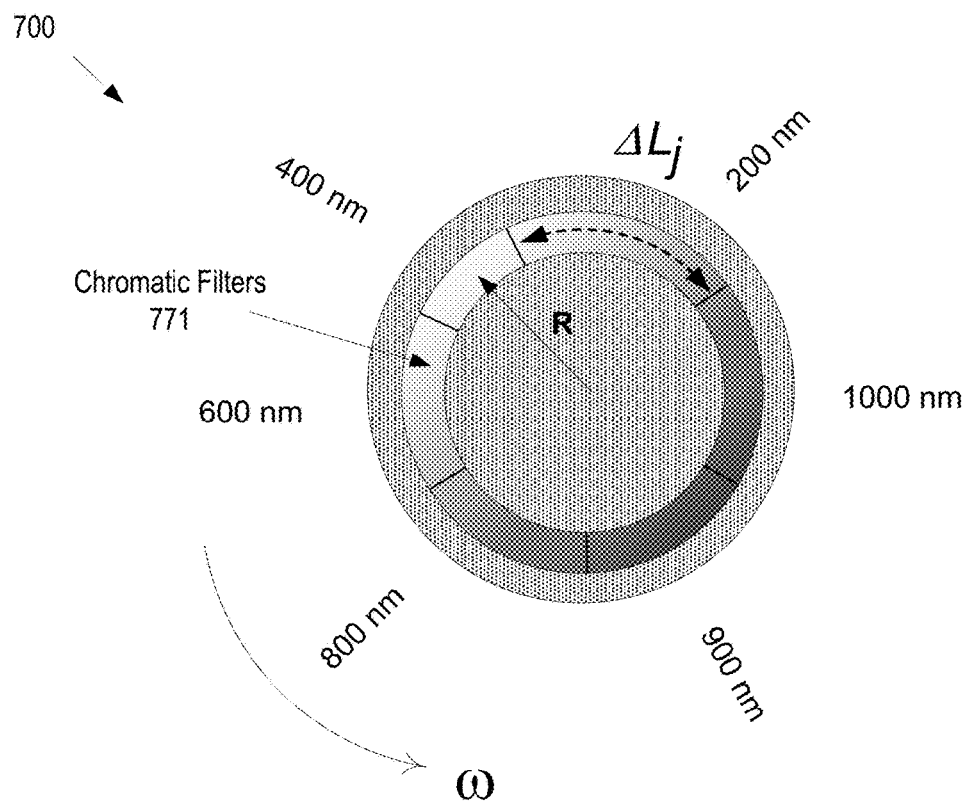
FIGS. 7A-B show exemplary illustrations of a spectral shaping device that uses time-domain shaping of an input light beam for precise optical characterization of targets within device manufacturing systems, in accordance with some implementations of the present disclosure.
Figure 7B:
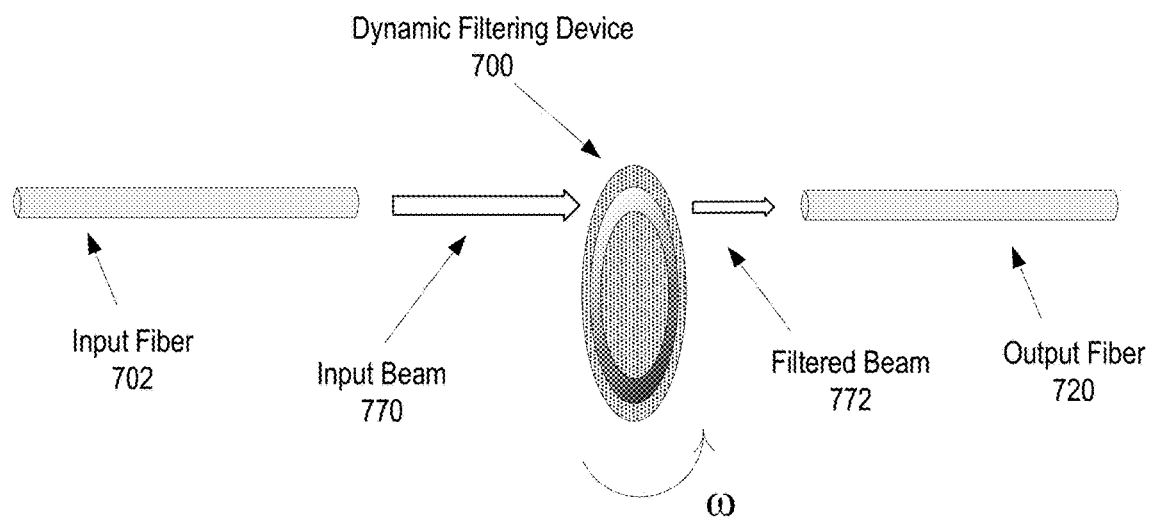

FIGS. 7A-B show exemplary illustrations of a spectral shaping device that uses time-domain shaping of an input light beam for precise optical characterization of targets within device manufacturing systems, in accordance with some implementations of the present disclosure. In the implementation depicted schematically in FIG. 7, shaping of an input light beam is performed using a dynamic filtering device 700 that includes a sequence of chromatic filters 771. In a specific non-limiting implementation of FIG. 7A, the chromatic filters 771 are arranged around a ring; the central wavelength of transmission for a respective filter (200 nm, 400 nm, and so on) is indicated. The dynamic filtering device 700 may be rotating with some angular velocity co so that the chromatic filters 771 are exposed to an input beam 770 delivered via an input fiber 702. A j-th chromatic filter may allow transmission of spectral components within the wavelength range $\Delta\lambda_j$ and may reflect (or absorb) other spectral components. The j-th chromatic filter may have length $\Delta L_j$ (counted along the circumferential direction) that may be different from the lengths of other chromatic filters. By controlling the length of each filter $\Delta L_j$ and/or the angular velocity of rotation co, the spectral intensity of the filtered beam 772 may be modified in a controlled manner. The filtered beam 772 may then be delivered, via an output fiber 720 to the substrate or any other optical target (if the input beam 770 is produced by a light source) or to a light detector (if the input beam 770 is a beam reflected from the substrate or some other optical target).

As a way of illustration, if the input beam 770 has a spectral intensity $I_{in}(\lambda_j)$ in the range $\Delta\lambda_j$ corresponding to the j-th chromatic filter, the spectral intensity $I_{out}(\lambda_j)$ of the output beam 772 will be determined by a fraction $\Delta t_j$ of the total period of rotation T during which the j-th chromatic filter is exposed to the input beam 770:

$$\frac{I_{out}(\lambda_j)}{I_{in}(\lambda_j)} = \frac{\Delta t_j}{T}.$$

Because the time of exposition $\Delta t_j$ is proportional to the length of the chromatic filter $\Delta L_j$ and inversely proportional to the angular velocity (DR) during the time when the j-th chromatic filter is exposed to the input beam, $\Delta t_j = \Delta L_j/(R\omega(\lambda_j))$, the output intensity is $$I_{out}(\lambda_j) = I_{in}(\lambda_j)\frac{\Delta L_j}{TR\,\omega(\lambda_j)}.$$

In some implementations, the desired output intensity may be independent of the wavelength. In one implementation, such uniform output intensity may be achieved using a constant angular frequency of rotation but variable-length filters, $$\frac{\Delta L_1}{\Delta L_2} = \frac{I_{in}(\lambda_2)}{I_{in}(\lambda_1)},$$

so that the length of each chromatic filter is inversely proportional to the intensity of the corresponding spectral component of the input beam. For each input beam 770 (e.g., produced by a particular light source), which may be used in optical characterization of targets, a designated dynamic filtering devices 700 may be configured, with the length of each chromatic filter designed to achieve the desired spectral shape of the output beam 772.

In some implementations, which may require added flexibility (e.g., ability to fine-tune the spectral shape of the output beam 772), the desired output beam profile may be achieved by setting an appropriate angular velocity for each chromatic filter. For example, if all chromatic filters have the same length, a uniform output intensity may be achieved using the angular frequency of rotation that varies when each chromatic filter that is being exposed to the input beam 770, according to $$\frac{\omega(\lambda_2)}{\omega(\lambda_1)} = \frac{I_{in}(\lambda_2)}{I_{in}(\lambda_1)},$$

so that the angular velocity of rotation during exposure of each chromatic filter is proportional to the intensity of the corresponding spectral component of the input beam.

In some implementations, the two above-described methods may be combined. For example, the chromatic filters may have lengths that are pre-determined based on the spectral shape of some average input beam 770 that is expected to be received (e.g., that corresponds to the factory specification of a particular light source) whereas deviations from such average spectral shape may be compensated by tuning the angular velocity. In some implementations, a motor (not shown in FIG. 7), such as electric motor, may cause the dynamic filtering device 700 to rotate. The motor may be controlled by a processing device (e.g., the microcontroller 152 and/or the computing device 118). The processing device may access the reflectivity (ellipsometry)

data output by the light detector 166 and compute the set of the angular velocity values ω (λ$_j$) necessary to achieve the desired spectral profile (e.g., uniform profile) of the output beam 772. Having computed the set of the angular velocity values, the processing device may cause the motor to receive a signal (e.g., a digital signal, in case the motor is equipped with its own microcontroller, or an analog signal) to control the angular velocity of the motor's rotation, in accordance with the computed set of values.

In some implementations, the processing device may determine the set of the angular velocity values ω(λ$_j$) necessary to achieve a desired spectral profile based on reflectivity/ellipsomentry data from a calibration device, which may be a reference substrate or some other target device with known optical properties.

Figure 8:
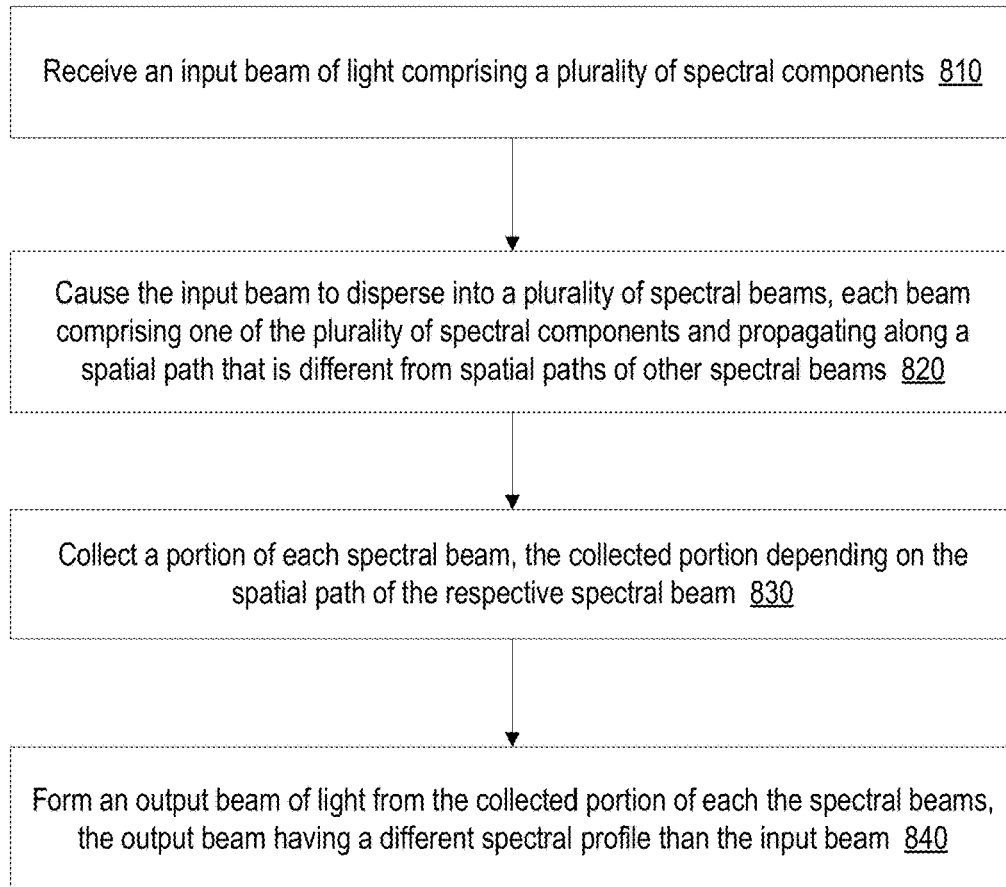
FIG. 8 is a flow diagram of one possible implementation of a method to perform spectral shaping of an input light beam for precise optical characterization of targets within device manufacturing systems, in accordance with some implementations of the present disclosure.

FIG. 8 is a flow diagram of one possible implementation of a method 800 to perform spectral shaping of an input light beam for precise optical characterization of targets within device manufacturing systems, in accordance with some implementations of the present disclosure. Method 800 may be performed using systems and components described in FIGS. 1-6 or any combination thereof. Some or all blocks of method 800 may be performed responsive to instructions from the computing device 118 or the microcontroller 152, in some implementations. The microcontroller 152 may be coupled to one or more memory devices (e.g., memory buffer 154). Similarly, the computing device 118 may include one or more memory devices. In some implementations, method 800 may be performed when a target (e.g., a substrate or a calibration device) is being processed in the process chamber 106 or transferred through the transfer chamber 104. In some implementations, method 800 may be performed when a calibration device or a reference substrate is in the process chamber 106.

Method 800 may be performed using a combination of optical elements, such as concave and convex mirrors, diverging and converging lenses, diffraction gratings, apertures, optical fibers, and other optical elements. For the sake of convenience of description, operations of method 800 are described below with reference to "first optical device" and "second optical device," but it shall be understood that in various implementations no physical boundary may separate the first optical device and the second optical device. In various implementations, optical elements and functionality that is attributed to the first optical device may be belong to the second optical device and vice versa.

Method 800 may involve receiving, by the first optical device, an input beam of light, the input beam having a plurality of spectral components of light (operation 810). In some implementations, the input beam may be produced by a source of light. In some implementations, the input beam may be delivered from the source of light to the first optical device via an optical fiber. In some implementations, the source of light may direct (over atmosphere or via an optical fiber) an incident beam of light to a substrate (or any other target) located within a process chamber (or a transfer chamber) of a substrate manufacturing machine. In such implementations, the input beam may be a light beam reflected from the substrate and caused by the incident beam.

At operation 820, method 800 may continue with the first optical device causing the input beam to disperse into a plurality of spectral beams. In some implementations, the first optical device may include a prism, a diffraction grating, a waveguide, or a tip of an optical fiber to cause the input beam to disperse into the plurality of spectral beams. In some implementations, it may be convenient to consider that the plurality of spectral beams includes at least three spectral beams. A first spectral beam may refer to spectral components in the visible range of wavelengths, a second spectral beam may refer to spectral component in the near IR, and a third spectral beam may refer to spectral component in the near UV range. For example, the first spectral beam may have components with wavelengths between 400 nm and 700 nm; the second spectral beam may have components with wavelengths above 700 nm; and the third spectral beam may have components with wavelengths below 400 nm. In other implementations, more than three spectral beams may be used to characterize propagation of light in the spectral shaping device used to perform method 800. In some implementations, continuous (or quasi-continuous) spectral beams may be used to characterize propagation of light. Each of the plurality of spectral beams may propagate along a spatial path that is different from spatial paths of each of other spectral beams of the plurality of spectral beams.

At operation 830, method 800 may continue with the second optical device collecting a portion of each of the plurality of spectral beams output by the first optical device. The collected portion of each spectral beam may depend on the spatial path of the respective spectral beam. In some implementations, the second optical device may include an aperture having a width that varies with a distance along the aperture, with each of the spectral beams passing through the aperture at a location that is different from passing locations of each of other spectral beams. In some implementations, the width of the aperture may be adjustable in at least a plurality of locations along the aperture. In some implementations, the second optical device may include a first focusing optical element (such as a converging lens or a concave mirror) to focus the spectral beams at the aperture.

In some implementations, the collected portion of the first spectral beam (e.g., having wavelength that is above 400 nm and below 700 nm) is less than the collected portion of the second spectral beam (e.g., having wavelength that is below 400 nm). In some implementations, the collected portion of the first spectral beam is less than the collected portion of the third spectral beam (e.g., having wavelength above 700 nm).

At operation 840, method 800 may continue with the second optical device forming an output beam of light from the collected portion of each of the spectral beams. For example, the second optical device may include a collimating optical element (such as a converging lens or a concave mirror) to collimate each of the spectral beams that passed through the aperture. In some implementations, the second optical device may include a dispersive (compensating) optical element to combine the collimated spectral beams. As a result, a spectral profile of the (combined) output beam may be different from a spectral profile of the input beam of light. In some implementations, the second optical device may also include a second focusing optical element to form the output beam from the combined plurality of collimated spectral beams. For example, the second focusing optical element (e.g., a converging lens or a concave mirror) may focus the combined collimated spectral beams at an opening of an output optical fiber.

In some implementations, the second optical device may direct the output beam to a light detector. In some implementations, the second optical device may direct the output beam to a substrate (or some other target). The output beam incident on the substrate may cause a reflected beam to propagate away from the substrate. The light detector may then receive (directly or via an optical fiber) the reflected light beam to determine spectral content of the reflected beam.

Figure 9:
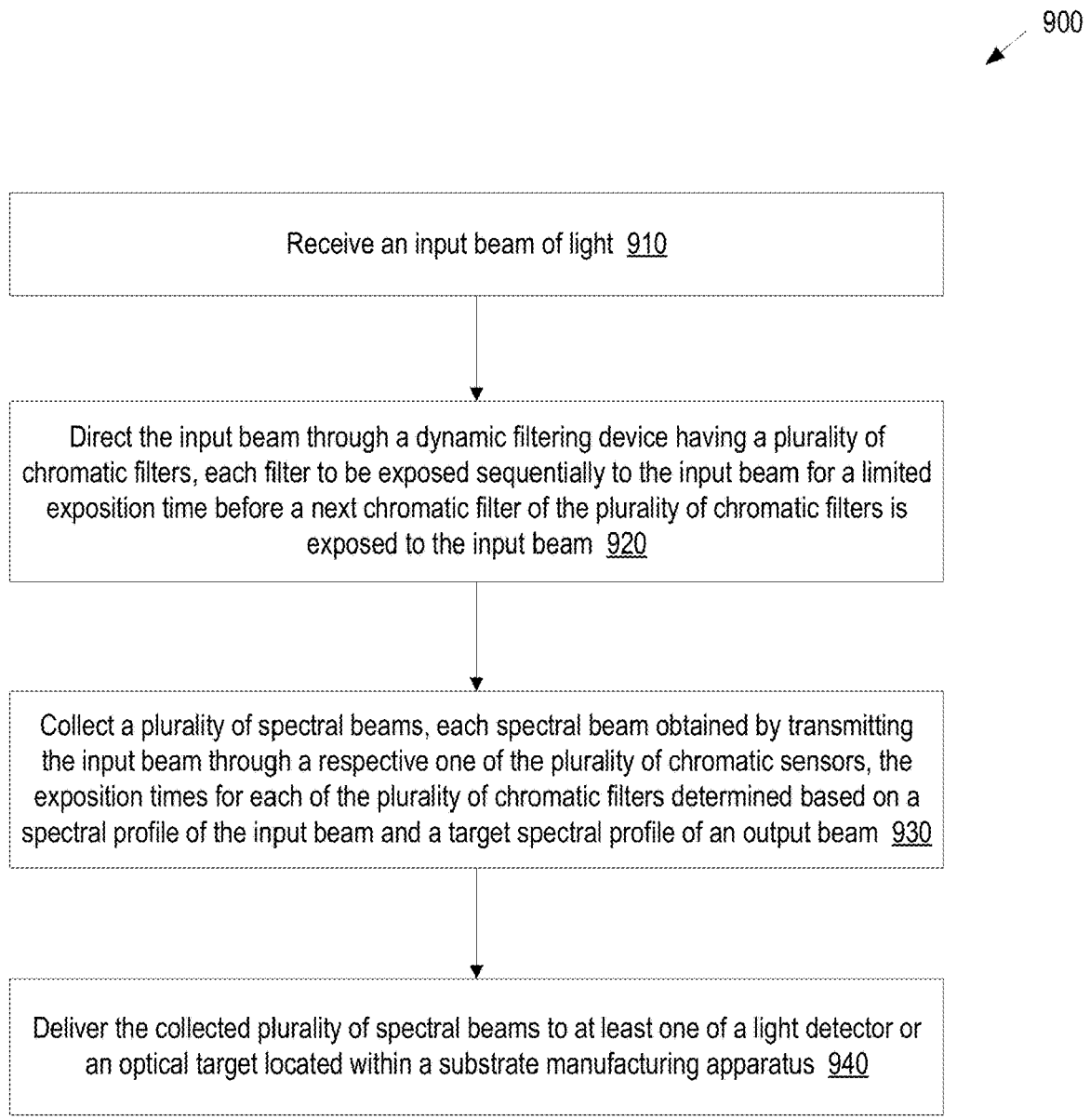
FIG. 9 is a flow diagram of one possible implementation of a method to form an output beam of light having a target time-averaged spectral profile, for precise optical characterization of targets within a process chamber, in accordance with some implementations of the present disclosure.

FIG. 9 is a flow diagram of one possible implementation of a method 900 to form an output beam of light having a target time-averaged spectral profile, for precise optical characterization of targets within a process chamber, in accordance with some implementations of the present disclosure. In some implementations, method 900 may be performed using systems and components described in FIGS. 1 and 7 or any combination thereof. Some or all blocks of method 900 may be performed responsive to instructions from the computing device 118 or the microcontroller 152, in some implementations. In some implementations, method 900 may be performed when an optical target (e.g., a substrate or a calibration device) is being processed inside a substrate manufacturing apparatus.

Method 900 may include receiving an input beam of light (operation 910) from a light source. In some implementations, the input beam of light may be a beam reflected from the optical target. At operation 920, method 900 may continue with directing the input beam through a dynamic filtering device. The dynamic filtering device may include a set of chromatic filters. Each of the chromatic filters may transmit light within a specific, to this filter, interval of wavelengths to a greater extent than the light with wavelengths outside this interval. (Spectral components with wavelengths outside the interval may be absorbed or reflected by the material of the respective chromatic filter.) Each of the chromatic filters may be exposed to the input beam for a limited exposition time before a next chromatic filter of the plurality of chromatic filters is exposed to the input beam. For example, the chromatic filters may be exposed to the input beam sequentially. In some implementations, the chromatic filters may be arranged in a circular pattern within the dynamic filtering device, as illustrated in FIG. 7A, and sequentially exposed to the input beam by a rotational motion imparted to the dynamic filtering device (e.g., by a motor).

At operation 930, method 900 may continue with collecting a set of spectral beams, each of the set of spectral beams obtained by transmitting the input beam through a respective chromatic sensor. Each of the transmitted spectral beams may be a pulse-like beam with a duration that is determined by the exposition time of the respective sensor. Accordingly, the output beam may have temporal periodicity with some period T The output beam may be a combination of spectral beams (pulses), each spectral pulse having a duration that is a fraction of the period T and which is equal to the exposition time of the corresponding chromatic filter. The exposition times for each of the chromatic filters may be determined based on a spectral profile of the input beam and a desired target spectral profile of the output beam, as explained above in more detail, in relation to FIG. 7.

At operation 940, method 900 may continue with delivering the collected plurality of spectral beams to at least one of a light detector or an optical target located within a substrate manufacturing apparatus.

FIG. 10 depicts a block diagram of an example processing device 1000 operating in accordance with one or more aspects of the present disclosure. The processing device 1000 may be a part of the computing device 118 of FIG. 1A, in one implementation. Example processing device 1000 may be connected to other processing devices in a LAN, an intranet, an extranet, and/or the Internet. The processing device 1000 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 1000 may include a processor 1002 (e.g., a CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processor 1002 represents one or more general-purpose processing devices such as a microprocessor, central processing unit, or the like. More particularly, processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 1002 may be configured to execute instructions implementing method 800 to perform spectral shaping of an input light beam for precise optical characterization of targets within device manufacturing systems and/or method 900 to form an output beam of light having a target time-averaged spectral profile.

Example processing device 1000 may further comprise a network interface device 1008, which may be communicatively coupled to a network 1020. Example processing device 1000 may further comprise a video display 1010 (e.g., a liquid crystal display (LCD), a touch screen, or a cathode ray tube (CRT)), an alphanumeric input device 1012 (e.g., a keyboard), an input control device 1014 (e.g., a cursor control device, a touch-screen control device, a mouse), and a signal generation device 1016 (e.g., an acoustic speaker).

Data storage device 1018 may include a computer-readable storage medium (or, more specifically, a non-transitory computer-readable storage medium) 1028 on which is stored one or more sets of executable instructions 1022. In accordance with one or more aspects of the present disclosure, executable instructions 1022 may comprise executable instructions implementing method 800 to perform spectral shaping of an input light beam for precise optical characterization of targets within device manufacturing systems and/or method 900 to form an output beam of light having a target time-averaged spectral profile.

Executable instructions 1022 may also reside, completely or at least partially, within main memory 1004 and/or within processor 1002 during execution thereof by example processing device 1000, main memory 1004 and processor 1002 also constituting computer-readable storage media. Executable instructions 1022 may further be transmitted or received over a network via network interface device 1008.

While the computer-readable storage medium 1028 is shown in FIG. 10 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system comprising:
   a first optical device to:
      receive an input beam of light, the input beam comprising a plurality of spectral components of light; and
      cause the input beam to disperse into a plurality of spectral beams, wherein each of the plurality of spectral beams comprises one of the plurality of spectral components of light, and wherein each of the plurality of spectral beams propagates along a spatial path that is different from spatial paths of each of other spectral beams of the plurality of spectral beams; and
   a second optical device to:
      collect a portion of each of the plurality of spectral beams, wherein the collected portion depends on the spatial path of the respective spectral beam; and
      form an output beam of light from the collected portion of each of the plurality of spectral beams, wherein a spectral profile of the output beam is different from a spectral profile of the input beam of light, and wherein the second optical device comprises an aperture having a width that varies with a distance along the aperture, wherein each of the spectral beams is to pass through the aperture at a location that is different from passing locations of each of the other spectral beams.

2. The system of claim 1, wherein the first optical device comprises a prism to cause the input beam to disperse into the plurality of spectral beams.

3. The system of claim 1, wherein the first optical device comprises a grating to cause the input beam to disperse into the plurality of spectral beams.

4. The system of claim 1, wherein the second optical device comprises a first focusing optical element to focus the plurality of spectral beams, dispersed by the first optical device, at the aperture.

5. The system of claim 4, wherein the first focusing optical element comprises at least one of a converging lens or a concave mirror.

6. The system of claim 4, wherein the second optical device further comprises a collimating optical element to collimate each of the plurality of spectral beams that passed through the aperture, and wherein the collimating optical element is one of a converging lens or a concave mirror.

7. The system of claim 6, wherein the second optical device further comprises a dispersive optical element to combine the plurality of collimated spectral beams.

8. The system of claim 7, wherein the second optical device further comprises a second focusing optical element to form the output beam from the combined plurality of collimated spectral beams.

9. The system of claim 8, wherein the second focusing optical element is to focus the combined plurality of collimated spectral beams at an opening of an output optical fiber.

10. The system of claim 1, wherein the width of the aperture is adjustable.

11. The system of claim 1, wherein a collected portion of a first spectral beam of the plurality of spectral beams is less than a collected portion of a second spectral beam of the plurality of spectral beams, wherein the first spectral beam comprises spectral components having wavelength that is above 400 nm and below 700 nm, and wherein the second spectral beam comprises spectral components having wavelength that is above 700 nm.

12. The system of claim 11, wherein a collected portion of a third spectral beam of the plurality of spectral beams is more than the collected portion of the first spectral beam, wherein the third spectral beam comprises spectral components having wavelength that is below 400 nm.

13. The system of claim 1, wherein the collected portion of a first spectral beam of the plurality of spectral beams is less than the collected portion of a second spectral beam of the plurality of spectral beams, wherein the first spectral beam comprises spectral components having wavelength that is above 400 nm and below 700 nm, and wherein the second spectral beam comprises spectral components having wavelength that is below 400 nm.

14. The system of claim 1, wherein the first optical device comprises a first waveguide having an opening to disperse the input beam delivered to the first waveguide into the plurality of spectral beams.

15. The system of claim 14, wherein the first waveguide is an optical fiber.

16. The system of claim 1, further comprising:
a source of light to produce the input beam received by the first optical device; and
a light detector to receive a light beam reflected from a substrate located within one of a process chamber or a transfer chamber of a substrate manufacturing apparatus, wherein the reflected light beam is caused by the output beam incident on the substrate.

17. The system of claim 1, further comprising:
a source of light to direct an incident beam of light on a substrate located within one of a process chamber or a transfer chamber of a substrate manufacturing apparatus; wherein the input beam is a light beam reflected from the substrate and caused by the incident beam; and
a light detector to receive the output beam.

18. A system comprising:
a source of light to direct an incident beam of light on a substrate located within one of a process chamber or a transfer chamber of a substrate manufacturing apparatus, wherein the incident beam is to cause a beam to be reflected from the substrate;
a first optical device to:
receive the reflected beam of light, the reflected beam comprising a plurality of spectral components of light; and
cause the received reflected beam to disperse into a plurality of spectral beams, wherein each of the plurality of spectral beams comprises one of the plurality of spectral components of light, and wherein each of the plurality of spectral beams propagates along a spatial path that is different from spatial paths of each of the other spectral beams of the plurality of spectral beams;
a second optical device to:
collect a portion of each of the plurality of spectral beams, wherein the collected portion depends on the spatial path of the respective spectral beam, and wherein the second optical device comprises an aperture having a width that varies with a distance along the aperture, wherein each of the spectral beams is to pass through the aperture at a location that is different from passing locations of each of the other spectral beams; and
a light detector to receive the collected portions of the spectral beams.

19. A method comprising:
receiving an input beam of light, the input beam comprising a plurality of spectral components of light;
causing, using a first optical device, the input beam to disperse into a plurality of spectral beams, wherein each of the plurality of spectral beams comprises one of the plurality of spectral components of light, and wherein each of the plurality of spectral beams propagates along a spatial path that is different from spatial paths of each of other spectral beams of the plurality of spectral beams;
causing, using a second optical device, a portion of each of the plurality of spectral beams, wherein the collected portion depends on the spatial path of the respective spectral beam, and wherein the second optical device comprises an aperture having a width that varies with a distance along the aperture, wherein each of the spectral beams is to pass through the aperture at a location that is different from passing locations of each of the other spectral beams; and
forming an output beam of light from the collected portion of each of the plurality of spectral beams, wherein a spectral profile of the output beam is different from a spectral profile of the input beam of light.

* * * * *